United States Patent
Aoki

(10) Patent No.: US 9,628,590 B2
(45) Date of Patent: Apr. 18, 2017

(54) METHOD FOR ENCODING AND DECODING SCHEME USING TIME STAMP

(71) Applicant: NIPPON HOSO KYOKAI, Shibuya-ku, Tokyo (JP)

(72) Inventor: Shuichi Aoki, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 143 days.

(21) Appl. No.: 14/498,132

(22) Filed: Sep. 26, 2014

(65) Prior Publication Data

US 2015/0010020 A1 Jan. 8, 2015

Related U.S. Application Data

(63) Continuation of application No. PCT/JP2013/058247, filed on Mar. 22, 2013.

(30) Foreign Application Priority Data

Mar. 28, 2012 (JP) .................................. 2012-073062

(51) Int. Cl.
*H04J 3/24* (2006.01)
*H04L 29/06* (2006.01)
(Continued)

(52) U.S. Cl.
CPC ............ *H04L 69/28* (2013.01); *H04N 19/70* (2014.11); *H04N 21/2368* (2013.01); *H04N 21/44* (2013.01)

(58) Field of Classification Search
CPC .... H04L 69/28; H04N 19/70; H04N 21/2368; H04N 21/44
See application file for complete search history.

(56) References Cited

U.S. PATENT DOCUMENTS

2003/0185245 A1* 10/2003 Kang ...................... H04L 69/22 370/503
2005/0185676 A1* 8/2005 Yang .............. H04N 21/234318 370/503
(Continued)

FOREIGN PATENT DOCUMENTS

EP 1 351 472 A2 10/2003
JP 2001-148853 A 5/2001
(Continued)

OTHER PUBLICATIONS

Office Action, and English language translation thereof, in corresponding Korean Application No. 10-2014-7028745, dated Nov. 6, 2015, 10 pages.
(Continued)

*Primary Examiner* — Abdelnabi O Musa
(74) *Attorney, Agent, or Firm* — Brinks Gilson & Lione

(57) ABSTRACT

An encoding device performing an encoding process according to an encoding scheme using a CTS indicating time at which presentation or reproduction is performed, comprising: an encapsulator that generates a media unit in which one or more access units encoded by the encoding scheme are capsulated, and a transmitter that transmits information indicating an absolute time of an access unit included at a top portion of the media unit, in addition to the media unit, wherein the encapsulator adds a CTS relative value to the $n^{th}$ access unit included in the media unit, the CTS relative value being a difference between the CTS of the $n^{th}$ access unit and the DTS of the $n+1^{th}$ access unit.

10 Claims, 17 Drawing Sheets

(51) Int. Cl.
*H04N 21/2368* (2011.01)
*H04N 21/44* (2011.01)
*H04N 19/70* (2014.01)

(56) References Cited

U.S. PATENT DOCUMENTS

| | | | | |
|---|---|---|---|---|
| 2008/0256431 | A1* | 10/2008 | Hornberger | G06F 17/30053 715/202 |
| 2013/0094594 | A1* | 4/2013 | Bae | H04N 21/236 375/240.26 |

FOREIGN PATENT DOCUMENTS

| | | |
|---|---|---|
| JP | 2002-094995 A | 3/2002 |
| JP | 2003-304288 A | 10/2003 |
| KR | 10-2003-0079069 A | 10/2003 |
| WO | WO 2013/004911 A1 | 1/2013 |

OTHER PUBLICATIONS

Extended European Search Report in European Application No. 13768776.0, dated Jul. 14, 2015, 5 pages.

Aoki, Shuichi et al., "A Transport Scheme for Media Components on Hybrid Broadcast Systems," and English language abstract thereof, *IPSJ SIG Technical Report*, vol. 2011-AVM-72 No. 1, Mar. 11, 2011, pp. 1-6.

International Telecommunication Union, ITU-T Telecommunication Standardization Sector of ITU, "Series H: Audiovisual and Multimedia Systems—Infrastructure of Audiovisual Services—Transmission Multiplexing and Synchronization," *International Standard ISO/IEC* 13818-1, ITU-T Recommendation H.222.0, 190 pages (in three attachments—A6-a; A6-b; A6-c).

Wenger, S. et al., "RTP Payload Format for H.264 Video," *Standards Track*, Network Working Group, RFC 3984, Feb. 2005, pp. 1-83.

International Search Report, and English translation thereof, in corresponding International Application No. PCT/JP2013/058247, dated May 28, 2013, 5 pages.

Office Action in corresponding European Application No. 13768776.0, dated Mar. 15, 2016, 6 pages.

Office Action in corresponding European Application No. 13768776.0, dated Oct. 6, 2016, 5 pages.

* cited by examiner

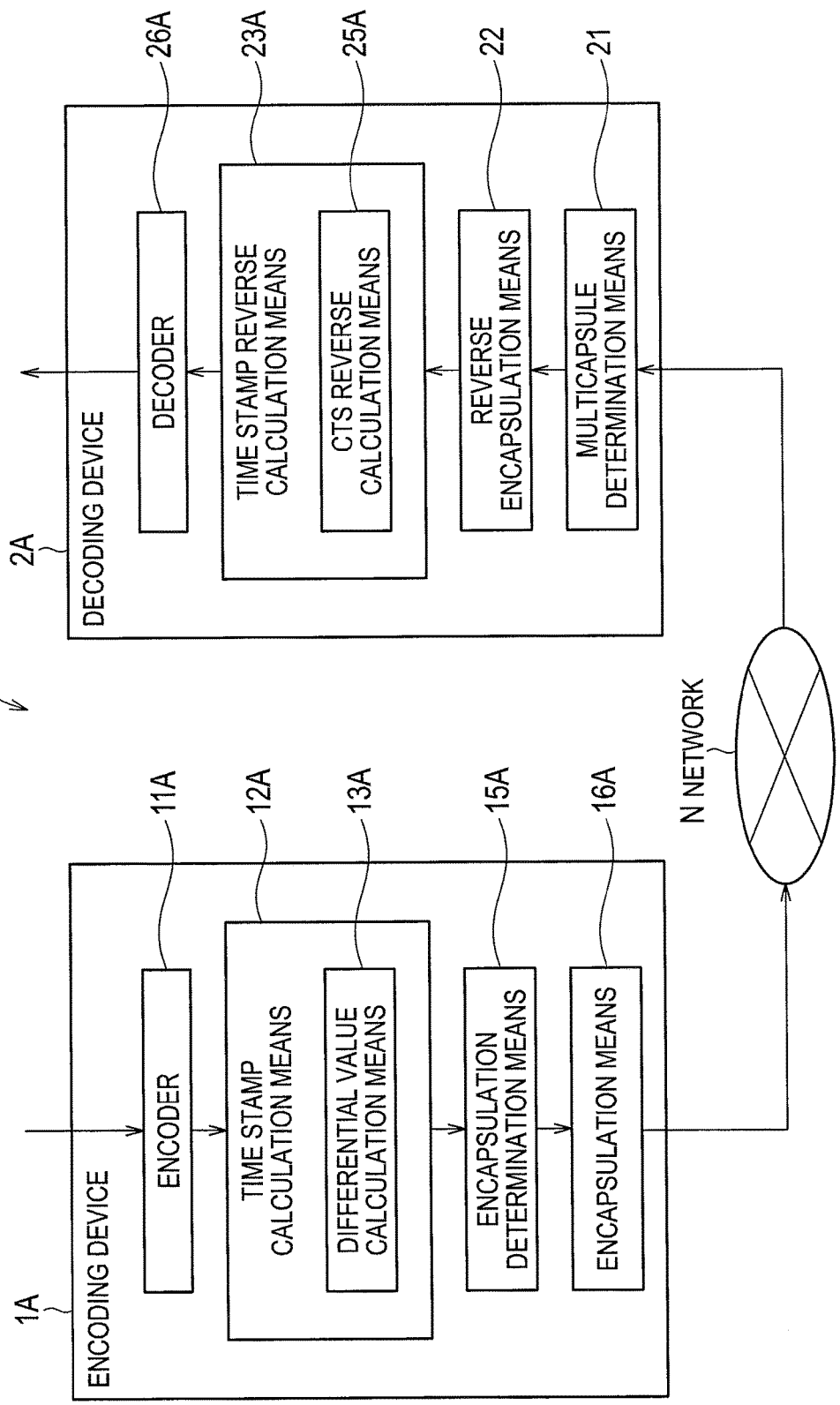

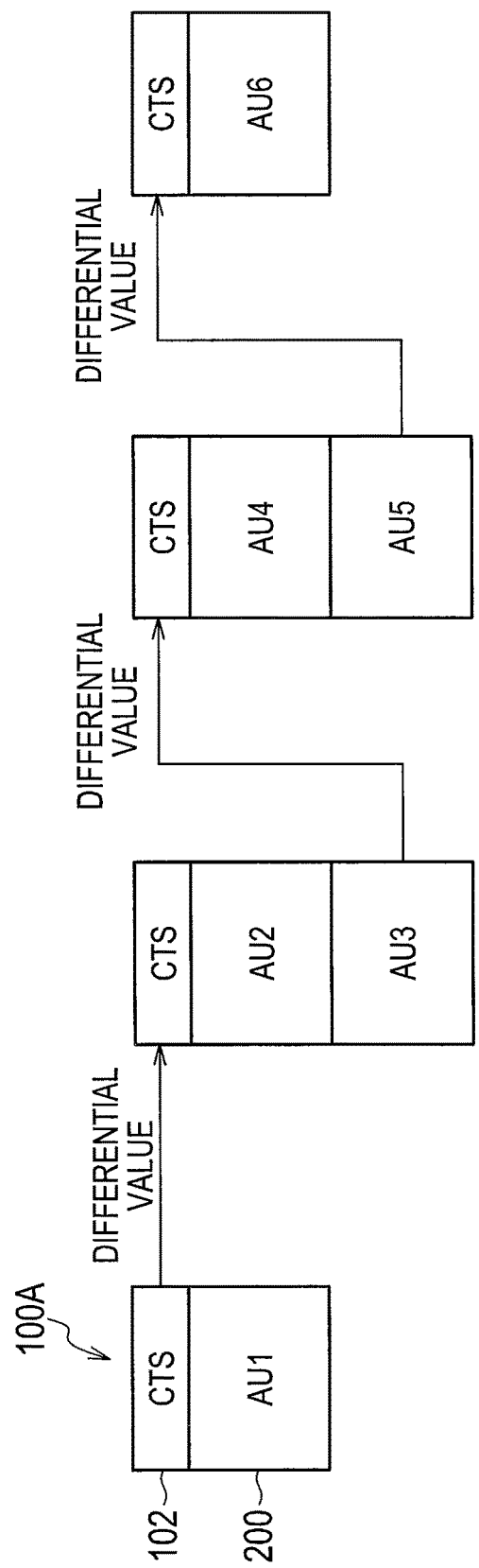

METHOD FOR ENCODING AND DECODING SCHEME USING TIME STAMP

RELATED APPLICATIONS

This application is a continuation of PCT/JP2013/058247 filed on Mar. 22, 2013, which claims priority to Japanese Application No. 2012-073062 filed on Mar. 28, 2012. The entire contents of these applications are incorporated herein by reference.

TECHNICAL FIELD

The present invention relates to an encoding device, a decoding device and programs for the same which encapsulate one or more access units into a media unit.

BACKGROUND ART

In a related art encoding device, as a format of an access unit correlated with a time stamp, PES (Packetized Elementary Stream) prescribed by MPEG (Moving Picture Experts Group)-2 System is known (Non Patent Literature 1).

As illustrated in FIG. 19(a), this PES 90 includes a field indicating a PES packet length (PES_packet_length), a field indicating a DTS (Decoding Time Stamp) and a field indicating a PTS (Presentation Time Stamp). Further, this PES 90 can encapsulate (i.e., store) one access unit (AU: Access Unit). In FIGS. 19(a) and 19(b), a part of the fields is not illustrated.

Further, in a related art encoding device, a format of RTP (Real-time Transport Protocol) payload prescribed by IETF (Internet Engineering Task Force) is also known (Non Patent Literature 2).

As illustrated in FIG. 19(b), this RTP payload 91 includes a field indicating a base time stamp (Base_Timestamp). Further, in this RTP payload 91, a plurality of NAL (Network Adaptation Layer) units which are smaller units than the access units can be encapsulated. At this time, the RTP payload 91 includes, for each NAL unit, a field indicating the size of this NAL unit (NALu1_length, NALu2_length) and a field indicating an offset value from a time stamp (NALu1_TS_offset, NALu2_TS_offset). The RTP payload 91 does not include a concept of decoding timing and, therefore, the time stamp indicates presentation timing.

CITATION LIST NONPATENT LITERATURE

Non Patent Literature 1: ITU-T Rec. H.222.0|ISO/IEC 13818-1
Non Patent Literature 2: IETF RFC 3984 "RTP Payload Format for H.264 Video"

SUMMARY OF THE INVENTION

However, as illustrated in FIG. 19(a), the related art PES 90 is not able to encapsulate a plurality of access units. Further, in the related art PES 90, in an audio signal of which access unit size is only hundreds of bytes, since the size of the field indicating the PES packet length is a fixed value of 16 bits, this field becomes redundant and causes overheads. On the other hand, in the related art PES, the number of bits of the field indicating this packet length is sometimes insufficient in high resolution image signals.

Further, a field indicating decoding timing is not included in the related art RTP payload 91. Further, in the related art RTP payload 91, since a field indicating size information of each NAL unit is needed even in a case in which one NAL unit is encapsulated, this field becomes redundant and causes overheads.

As described above, in the techniques described in Non Patent Literature 1 and Non Patent Literature 2, the overheads and the shortage of fields caused during encapsulation of an audio signal and an image signal result in problems. Therefore, there is a strong demand for executing encapsulation in an optimum format.

Then, an object of the present invention is to solve the problems described above and to provide an encoding device, a decoding device and programs therefor that are capable of encapsulating in an optimum format.

In the light of the above problem, an encoding device according to a first invention of the present application summarized as a encoding device which encodes an input signal according to an encoding scheme using a CTS indicating time at which presentation or reproduction is performed and a DTS indicating time at which decoding is performed, comprising an encoder, an a differential value calculation means, an offset value calculation means, an encapsulation determination means and an encapsulation means.

According to the configuration described above, the encoding device generates the access unit correlated with the CTS and the DTS by encoding the input signal using the encoder. Further, the encoding device calculates, by the differential value calculation means, a differential value between the DTS of the access unit and the DTS of another access unit encoded immediately before the access unit. Then the encoding device calculates, by the offset value calculation means, an offset value which is a difference between the DTS and the CTS of the access unit.

Further, the encoding device determines, by the encapsulation determination means, as an encapsulation unit, one or more access units of which differential values become identical within predetermined determination time, and offset values become identical. Then the encoding device encapsulates, by the encapsulation means, one or more access units included in the encapsulation unit into a media unit and adds the same differential value and the same offset value to the media unit.

Here, in a case in which the encapsulation means encapsulates one access unit, the encapsulation means adds, to the media unit, a value indicating that size information for each access unit is not included as encapsulation determination information. On the other hand, in a case in which the encapsulation means encapsulates a plurality of access units, the encapsulation means adds, to the media unit, a value indicating that size information for each access unit is included as encapsulation determination information and adds the size information to the media unit.

Even in a case in which a plurality of access units are encapsulated, only one field indicating decoding timing (for the differential value) and only one field indicating decoding timing (for the offset value) are included in the media unit encapsulated by this encapsulation means. Further, in a case in which one access unit is encapsulated, the media unit includes no field indicating size information. In this manner, since no redundant field is included in the media unit, overheads can be reduced.

The media unit is a packet form (i.e., format) used in packetization of the access unit and in which useful information at the time of decoding this access unit (for example, the time stamp indicating decoding timing) is stored. The encapsulation determination information is information for determining the number of encapsulated access units. In other words, the encapsulation determination information is information for determining whether a plurality of access units have been encapsulated. The size information is information indicating size (i.e., data length) of each access unit.

In the light of the above problem, an encoding device according to a second invention of the present application summarized as a encoding device which encodes an input signal accordion to an encoding scheme using a CTS indicating time at which presentation or reproduction is performed, comprising an encoder, an a differential value calculation means, an offset value calculation means, an encapsulation determination means and an encapsulation means.

According to the configuration described above, the encoding device generates the access unit correlated with the CTS by encoding the input signal by the encoder. Further, the encoding device calculates, by the differential value calculation means, a differential value between the CTS of the access unit and the CTS of another access unit encoded immediately before the access unit.

Further, the encoding device determines, by the encapsulation determination means, one or more access units of which differential values become identical within predetermined determination time as the encapsulation unit. Then the encoding device encapsulates, by the encapsulation means, one or more access units included in the encapsulation unit into the media unit and adds the same differential value to the media unit.

Here, if one access unit is to be encapsulated, the encapsulation means adds, to the media unit, a value indicating that size information for each access unit is not included as encapsulation determination information and, if the plurality of access units are to be encapsulated, the encapsulation means adds, to the media unit, a value indicating that size information for each access unit is included as the encapsulation determination information and adds the size information to the media unit.

Even in a case in which a plurality of access units are encapsulated, only one field indicating decoding timing (for the differential value) is included in the media unit encapsulated by this encapsulation means. Further, in a case in which one access unit is encapsulated, the media unit includes no field indicating size information. In this manner, since no redundant field is included in the media unit, overheads can be reduced.

In the encoding device according to a third invention of the present application, the encapsulation means adds, to the media unit, different values for each size range of the predetermined access unit as the encapsulation determination information, if the plurality of access units are to be encapsulated, and adds the size information to the media unit with predetermined number of bits depending on the value of the encapsulation determination information.

According to the configuration described above, the encoding device makes the length of the size information to be added to the media unit variable depending on the size of each access unit. Therefore, even in a case in which the access units have various sizes (for example, from hundreds of bytes to several gigabytes), the encoding device can avoid a situation in which the field indicating size information becomes redundant and a situation in which the number of bits of the field indicating this size information becomes insufficient.

In the light of the above problem, a decoding device according to a fourth invention of the present application is summarized as a decoding device in which a media unit into which one or more access units are encapsulated is input from the encoding device according to the first invention of the present application and which decodes the access unit according to a decoding scheme using a CTS indicating time at which presentation or reproduction is performed and a DTS indicating time at which decoding is performed, comprising a multicapsule determination means, a media unit extraction means, a DTS reverse calculation means, a CTS reverse calculation means and a decoder.

According to the configuration described above, the decoding device determines by the multicapsule determination means whether a plurality of access units have been encapsulated into the media unit based on the encapsulation determination information added to the input media unit. Further, when it is determined by the multicapsule determination means that a plurality of access units have been encapsulated, the decoding device extracts, by the media unit extraction means, a plurality of access units from the media unit and, when it is determined that a plurality of access units have not been encapsulated, the decoding device extracts one access unit from the media unit.

Here, even in a case in which a plurality of access units are encapsulated, only one time stamp indicating decoding timing (for the differential value) and only one time stamp indicating decoding timing (for the offset value) are included in the media unit input in the decoding device. On the other hand, in order to decode the access unit of an image, the CTS and the DTS are necessary for each access unit.

Therefore, the decoding device reversely calculates, by the DTS reverse calculation means, as a DTS of the access unit, a value obtained by adding a differential value added to the media unit and the DTS of another access unit located immediately before the access unit extracted from the media unit. Further, the decoding device reversely calculates, by the CTS reverse calculation means, as a CTS of the access unit extracted from the media unit, a value obtained by adding an offset value added to the media unit and the DTS of the access unit reversely calculated by the DTS reverse calculation means. Then the decoding device decodes, by the decoder, the access unit of which DTS and CTS have been reversely calculated.

In the light of the above problem, a decoding device according to a fifth invention of the present application is summarized as a decoding device in which a media unit into which one or more access units are encapsulated is input from the encoding device according to the second invention of the present application and which decodes the access unit according to a decoding scheme using a CTS indicating time at which presentation or reproduction is performed, comprising a multicapsule determination means, a media unit extraction means, a DTS reverse calculation means, a CTS reverse calculation means and a decoder.

According to the configuration described above, the decoding device determines, by the multicapsule determination means, whether a plurality of access units have been encapsulated into the media unit based on the encapsulation determination information added to the input media unit. Further, when it is determined by the multicapsule determination means that a plurality of access units have been encapsulated the decoding device extracts, by the media unit extraction means, a plurality of access units from the media unit and, when it is determined that a plurality of access units have not been encapsulated, the decoding device extracts one access unit from the media unit.

Here, even in a case in which a plurality of access units are encapsulated, only one time stamp indicating decoding timing (for the differential value) is included in the media unit input in the decoding device. On the other hand, in order to decode the access unit of audio, the CTS is necessary for each access unit.

Therefore, the decoding device reversely calculates, by the CTS reverse calculation means, as the CTS of the access unit, a value obtained by adding a differential value added to the media unit and the CTS of another media unit located immediately before the access unit extracted from the media unit. Further, the decoding device decodes the access unit of which CTS has been reversely calculated by the decoder.

In the decoding device according to a sixth invention of the present application, the media unit extraction means extracts the plurality of access units from the media unit based on size information of each of the access units added to the media unit when it is determined by the multicapsule determination means that the plurality of access units have been encapsulated. According to the configuration described above, the decoding device can precisely specify a data field of the media unit into which each access unit is encapsulated by referring to the size information.

In the light of the above problem, an encoding device according to a seventh invention of the present application summarized as a encoding device which encodes an input signal according to an encoding scheme using a CTS indicating time at which presentation or reproduction is performed and a DTS indicating time at which decoding is performed, comprising an encoder, an encapsulation determination means, a DTS relative value calculation means, a CTS relative value calculation means, an encapsulation means and a transmission means.

According to the configuration described above, the encoding device generates the access unit correlated with the CTS and the DTS by encoding the input signal according to an encoding scheme by the encoder. Further, the encoding device determines, by the encapsulation determination means, one or more access units as an encapsulation unit on a predetermined encapsulation condition.

This encapsulation condition is a condition which can be set arbitrarily: for example, a predetermined number of access units are defined as an encapsulation unit, or access units encoded within predetermined time are defined as an encapsulation unit.

Further, the encoding device calculates, by the DTS relative value calculation means, zero as the DTS relative value of the access unit which is encoded first and calculates, as a DTS relative value of the access unit which is encoded second or thereafter, a difference between the DTS of the access unit and the DTS of another access unit encoded immediately before the access unit.

Further, the encoding device calculates, by the CTS relative value calculation means, as the CTS relative value of the access unit, a difference between the CTS of the access unit and the CTS of another access unit encoded immediately after the access unit.

Further, the encoding device encapsulates, by the encapsulation means, one or more access units determined as the encapsulation unit into the media unit and adds the DTS relative value and the CTS relative value to each access unit. Then the encoding device transmits, by the transmitting means, the media unit and a control signal which includes absolute time indicating the head of the media unit.

In this manner, in the encoding device, a format in which base absolute time of the DTS and the CTS is added to the control signal, and in which the DTS relative value and the CTS relative value are added to the access unit is adopted.

In the light of the above problem, an encoding device according to an eighth invention of the present application summarized as a encoding device which encodes an input signal according to an encoding scheme using a CTS indicating time at which presentation or reproduction is performed, comprising an encoder, an encapsulation determination means, a CTS relative value calculation means, an encapsulation means and a transmission means.

According to the configuration described above, the encoding device generates the access unit correlated with the CTS by encoding the input signal according to the encoding scheme by the encoder. Further, the encoding device determines, by the encapsulation determination means, one or more access units as encapsulation unit on a predetermined encapsulation condition.

Further, the encoding device calculates, by the CTS relative value calculation means, as the CTS relative value of the access unit, a difference between the CTS of the access unit and the CTS of another access unit encoded immediately after the access unit. Then the encoding device encapsulates, by the encapsulation means, one or more access units determined as the encapsulation unit into the media unit and adds the CTS relative value to each access unit. Further, the encoding device transmits, by the transmitting means, the media unit and a control signal which includes absolute time indicating the head of the media unit in an associated manner.

In this manner, in the encoding device, a format in which base absolute time of the CTS is added to the control signal, and in which the CTS relative value is added to the access unit is adopted.

In the encoding device according to a ninth invention of the present application, the transmitting means adds, to the media unit and a control signal corresponding to the media unit, an identifier which is common in the predetermined media units, and a sequence number specific to the media units. According to the configuration described above, the encoding device can correlate the media unit with the control signal precisely.

In the light of the above problem, a decoding device according to a tenth invention of the present application summarized as a decoding device in which a media unit into which one or more access units are encapsulated is input from the encoding device according to the seventh invention of the present application and which decodes the access unit according to a decoding scheme using a CTS indicating time at which presentation or reproduction is performed and a DTS indicating time at which decoding is performed, comprising a reception means, a media unit extraction means, a DTS reverse calculation means, a CTS reverse calculation means and a decoder.

According to the configuration described above, the decoding device receives, by the reception means, the media unit and the control signal which includes absolute time indicating the head of the media unit. Further, the decoding device extracts one or more access units from the media unit by the media unit extraction means.

Further, the decoding device reversely calculates, by the DTS reverse calculation means, absolute time of the control signal corresponding to the media unit as the DTS of the access unit located at the head and reversely calculates, as the DTS of the access unit located at the second place or thereafter, a value obtained by adding the DTS relative value of the access unit and the DTS of another access unit located immediately before the access unit.

Further, the decoding device reversely calculates, by the CTS reverse calculation means, as the CTS of another access unit located immediately after the access unit, a value obtained by adding absolute time of the control signal corresponding to the media unit and a sum of the CTS relative values from the access unit located at the head to the access unit. Then the decoding device decodes the access unit of which DTS and CTS have been reversely calculated by the decoder according to the decoding scheme.

In this manner, in the decoding device, a format in which base absolute time of the DTS and the CTS is added to the control signal, and in which the DTS relative value and the CTS relative value are added to the access unit is adopted.

In the light of the above problem, a decoding device according to an eleventh invention of the present application summarized as a decoding device in which a media unit into which one or more access units are encapsulated is input from the encoding device according to the seventh invention of the present application and which decodes the access unit according to a decoding scheme using a CTS indicating time at which presentation or reproduction is performed, comprising a reception means, a media unit extraction means, a CTS reverse calculation means and a decoder.

According to the configuration described above, the decoding device receives, by the reception means, the media unit and the control signal which includes absolute time indicating the head of the media unit. Further, the decoding device extracts one or more access units from the media unit by the media unit extraction means.

Further, the decoding device reversely calculates, by the CTS reverse calculation means, as the CTS of another access unit located immediately after the access unit, a value obtained by adding absolute time of the control signal corresponding to the media unit and a sum of the CTS relative values from the access unit located at the head to the access unit. Then the decoding device decodes the access unit of which CTS has been reversely calculated by the decoder according to the decoding scheme.

In this manner, in the decoding device, a format in which base absolute time of the CTS is added to the control signal, and in which the CTS relative value is added to the access unit is adopted.

In the decoding device according to the twelfth invention of the present application, in the reception means, an identifier which is common in the predetermined media units and a sequence number specific to the media unit have been added to the received media unit and to a control signal corresponding to the media unit. According to the configuration described above, the decoding device can correlate the media unit with the control signal precisely.

The encoding device according to the first, second, seventh and eighth inventions of the present application may also be implemented as an encoding program which causes a hardware resource provided in a computer, such as a central processing unit (CPU), a memory and a HDD (Hard Disk Drive) to cooperatively operate as each means described above. This encoding program may be distributed via a communication line or may be distributed by being written in a recording medium, such as a CD-ROM and a flash memory.

The decoding device according to the fourth, fifth, tenth and eleventh inventions of the present application may also be implemented as a decoding program which causes a hardware resource provided in a computer, such as a CPU, a memory and a HDD, to cooperatively operate as each means described above. This decoding program may be distributed via a communication line or may be distributed by being written in a recording medium, such as a CD-ROM and a flash memory.

According to the present invention, the following excellent effects are exhibited. According to the first and fourth inventions of the present application, even in a case in which a plurality of access units are encapsulated, only one field indicating decoding timing (for the differential value) and only one field indicating decoding timing (for the offset value) are included in the media unit. Further, according to the first and fourth inventions of the present application, in a case in which one access unit is encapsulated, a field indicating size information of the access unit is not included in the media unit. Therefore, according to the first and fourth inventions of the present application, since no redundant field is included in the media unit, overheads in this media unit can be reduced and encapsulation in an optimum format becomes possible.

According to the second and fifth invention of the present application, even in a case in which a plurality of access units are encapsulated, only one field indicating decoding timing (for a differential value) is included in a media unit. According to the second and fifth invention of the present application, in a case in which one access unit is encapsulated, a field indicating size information of the access unit is not included in the media unit. Therefore, according to the second and fifth invention of the present application, since no redundant field is included in the media unit, overheads in this media unit can be reduced and encapsulation in an optimum format becomes possible.

According to the third invention of the present application, a situation in which the field indicating size information becomes redundant and a situation in which the number of bits of the field indicating this size information becomes insufficient can be avoided. According to the sixth invention of the present application, since the data field of the media unit into which a plurality of access units are encapsulated can be specified precisely, data missing during extraction of the access unit can be prevented.

According to the seventh and tenth inventions of the present application, a format in which base absolute time of the DTS and the CTS is added to the control signal, and in which the DTS relative value and the CTS relative value are added to the access unit is adopted. Therefore, according to the seventh and tenth inventions of the present application, encapsulation in an optimum format becomes possible with which a change in time at which the access unit is decoded, a change in time at which the access unit is presented or reproduced, commonization of the media unit, and switching of the transmission paths are implemented easily.

According to the eighth and eleventh inventions of the present application, a format in which base absolute time of the CTS is added to the control signal, and in which the CTS relative value is added to the access unit is adopted. Therefore, to the eighth and eleventh inventions of the present application, access unit enables encapsulation in an optimum format becomes possible with which a change in time at which the access unit is presented or reproduced, commonization of the media unit, and switching of the transmission paths are implemented easily.

According to the ninth and twelfth inventions of the present application, since the media unit and the control signal can be correlated precisely, accurate DTS and CTS can be reversely calculated.

BRIEF DESCRIPTION OF THE DRAWINGS

FIG. 6 is a block diagram illustrating configurations of an encoding device and a decoding device according to a second embodiment of the present invention.

FIG. 8 is a diagram illustrating differential values in the second embodiment of the present invention.

DETAILED DESCRIPTION OF THE PREFERRED EMBODIMENTS

First Embodiment

[Outline of Content Providing System]

Figure 1:
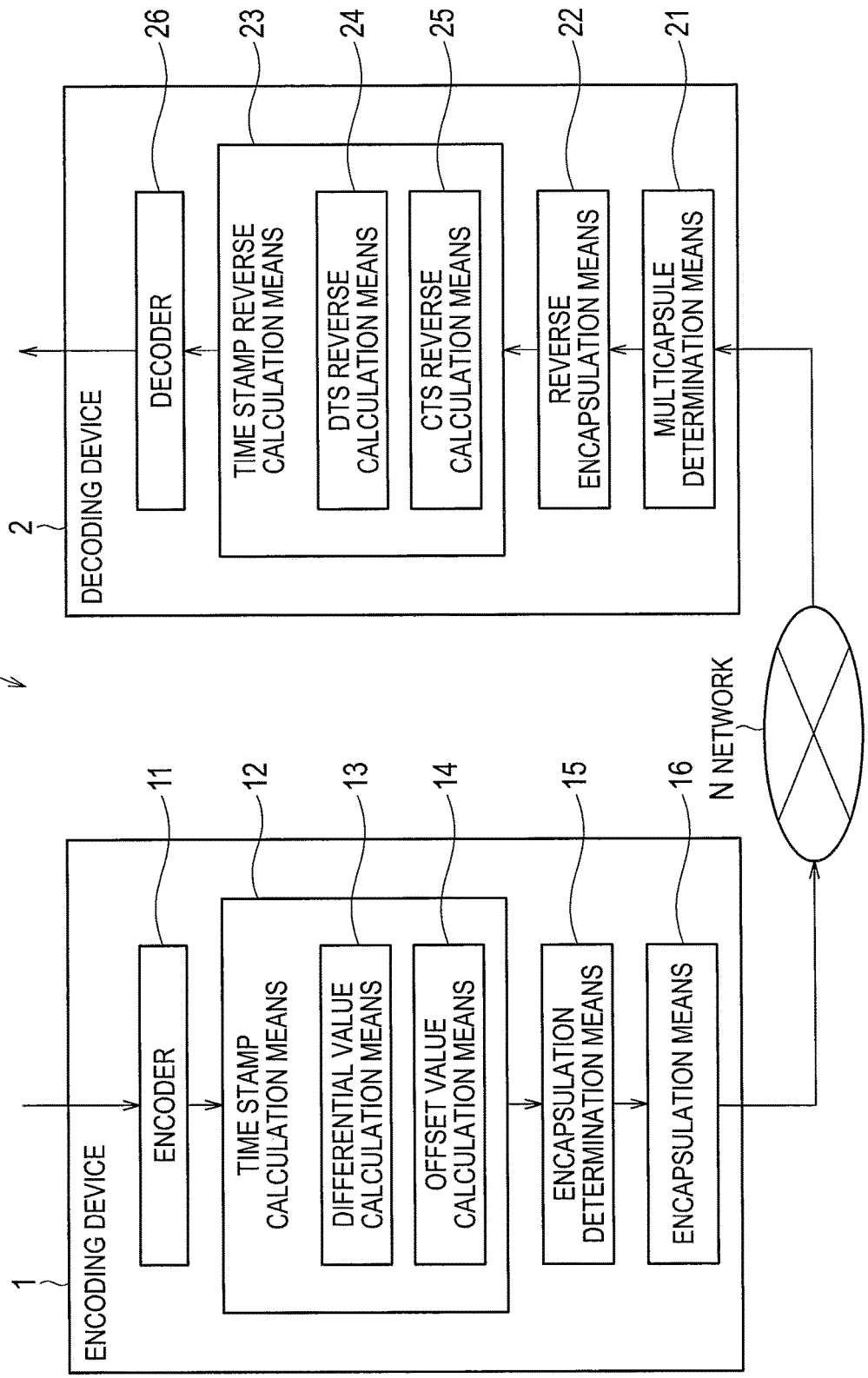
FIG. 1 is a block diagram illustrating configurations of an encoding device and a decoding device according to a first embodiment of the present invention.

Hereinafter, each embodiment of the present invention will be described in detail with reference to the drawings as necessary. In each embodiment, means having the same functions are denoted by the same reference numeral and description thereof is omitted.

As illustrated in FIG. 1, a content providing system 1000 according to an embodiment of the present invention provides content (i.e., an image) and includes an encoding device 1 and a decoding device 2. In this content providing system 1000, the encoding device 1 and the decoding device 2 are connected to each other via a network N. This network N is an IP packet transmission path, such as the Internet and an intranet. In the present embodiment, it is supposed that the content providing system 1000 includes one encoding device 1 and one decoding device 2.

[Configuration of Encoding Device]

Hereinafter, a configuration of the encoding device 1 will be described. The encoding device 1 encodes an image signal as an input signal and provides the encoded image signal to the decoding device 2. Therefore, the encoding device 1 includes an encoder 11, a time stamp calculation means 12, an encapsulation determination means 15 and an encapsulation means 16.

The encoder 11 generates an access unit with (to) which a CTS and a DTS are correlated (added) by encoding an image signal input from outside according to an encoding scheme in which the CTS and the DTS are used.

Here, the encoder 11 encodes the input image signal using an image encoding scheme, such as MPEG (Moving Picture Experts Group)-2 Video or MPEG-4 AVC (Advanced Video Coding), and generates an access unit of an image. Here, in a case in which a decoding order and a presentation order of the access unit differ as in the case of the image signal, the CTS and the DTS are correlated with each access unit. The encoder 11 sequentially outputs, to the time stamp calculation means 12, the access unit correlated with the CTS and the DTS.

The CTS (Composition Time Stamp) is information indicating time at which presentation or reproduction is performed, and the CTS and the PTS are sometimes used with the same meaning. The DTS is information indicating time at which decoding is performed. The access unit is a collection of codes (i.e., input signals) having identical DTS. The input signals are signals to be encoded and decoded, such as image signals and audio signals.

The time stamp calculation means 12 calculates a time stamp to be added to a media unit (i.e., a differential value of the DTS and an offset value) and includes a differential value calculation means 13 and an offset value calculation means 14.

The differential value calculation means 13 calculates a differential value between the DTS of the access unit input from the encoder 11 and a DTS of another access unit encoded immediately before this access unit.

Here, in a case in which the access unit is the head access unit, since no preceding access unit exists immediately before the head access unit, the differential value calculation means 13 calculates the differential value as '0.' At this time, since the differential value calculation means 13 sequentially performs processing to the access units which are continuous in the time direction, the differential value calculation means 13 temporarily stores in an unillustrated memory, as a DTS of another access unit, the DTS of the access unit for which differential value has been calculated. Further, in a case in which the access unit is the second access unit or thereafter, the differential value calculation means 13 calculates a differential value between the DTS of the input access unit and the DTS of another access unit which is stored temporarily.

The offset value calculation means 14 calculates an offset value which is a difference between the DTS and the CTS of the access unit input from the encoder 11. That is, the offset value calculation means 14 calculates, as an offset value, a difference between the DTS and the CTS which are correlated with an identical access unit.

Then, the time stamp calculation means 12 sequentially outputs, to the encapsulation determination means 15, the access unit input from the encoder 11, the differential value calculated by the differential value calculation means 13 and the offset value calculated by the offset value calculation means 14.

The encapsulation determination means 15 determines, as an encapsulation unit, one or more access units which satisfy a later-described determination condition within predetermined determination time among the access units input from the time stamp calculation means 12. This determination condition is a condition in which the differential values become identical and, at the same time, the offset values become identical. Further, the encapsulation unit indicates an access unit that can be encapsulated in the same media unit.

That is, the encapsulation determination means 15 determines whether sequentially input access units satisfy a determination condition while counting a timer. The encapsulation determination means 15 then determines, as an encapsulation unit, one or more access units which satisfy the determination condition when determination time elapsed on the timer.

For example, in a case in which two access units input within the determination time satisfy the determination condition, the encapsulation determination means 15 determines the two access units as the identical encapsulation unit. On the other hand, in a case in which two access units input within the determination time do not satisfy the determination condition, the encapsulation determination means 15 determines the two access units as separate encapsulation units. Then, the encapsulation determination means 15 outputs, for each encapsulation unit, a differential value, an offset value and an access unit included in the encapsulation unit.

The encapsulation means 16 encapsulates (i.e., stores), in a media unit, one or more access units determined as an encapsulation unit by the encapsulation determination means 15 and describes (i.e., adds) the identical differential value and the identical offset value in (to) the media unit.
<Format of Medium Unit>

Figure 2A:
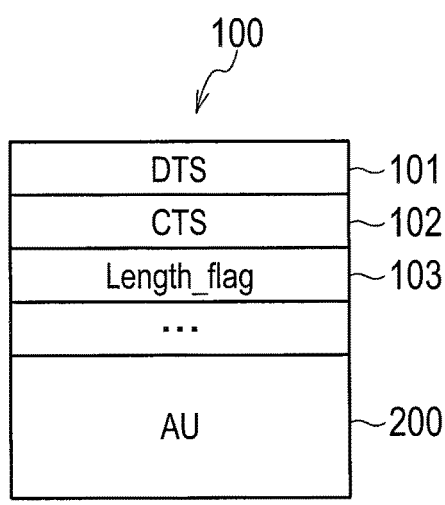
FIG. 2(a) is a diagram illustrating a format of a media unit in which one access unit is encapsulated in the first embodiment of the present invention and FIG. 2(b) is a diagram illustrating a format of a media unit in which a plurality of access units are encapsulated in the first embodiment of the present invention.

With reference to FIG. 2(a), a media unit 100 in which one access unit 200 is encapsulated will be described. The encapsulation means 16 describes an input differential value in a DTS field 101. Further, the encapsulation means 16 describes an input offset value in a CTS field 102. Then the encapsulation means 16 describes in an encapsulation determination information field (Length_flag) 103, as encapsulation determination information, a value indicating that size information is not included (for example, '0'). This encapsulation determination information field 103 is secured, for example, as 2 bit width. The encapsulation means 16 encapsulates one access unit 200 into the media unit 100 (AU of FIG. 2(a)).

Although the media unit 100 includes fields for a time stamp flag, an extension header flag, a random access point flag and the like, these fields are not directly related to the present invention and, therefore, description and illustration thereof will be omitted. Further, details of the media unit 100 are described, for example, in a reference "Media Transport System in Hybrid Broadcasting" Information Processing Society of Japan Research Report, Vol. 2011-AVN-72 No. 1 2011/3/11.

Figure 2B:
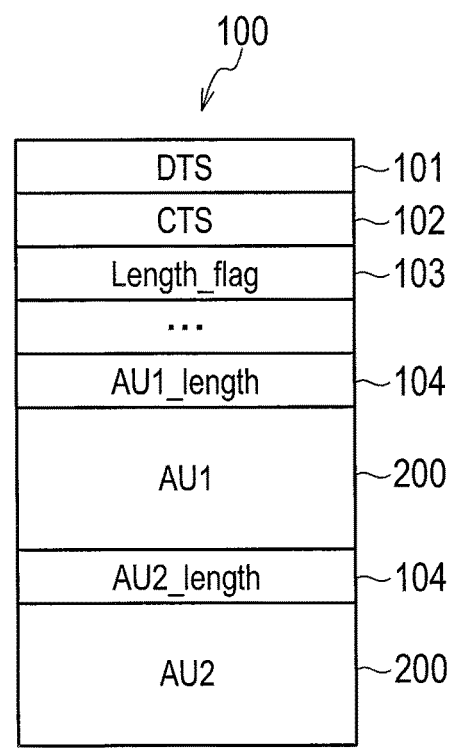

Next, as illustrated in FIG. 2(b), the media unit 100 in which two access units 200 are encapsulated will be described. In this case, the encapsulation means 16 describes an input differential value in the DTS field 101. Further, the encapsulation means 16 describes an input offset value in the CTS field 102.

Further, the encapsulation means 16 describes in the encapsulation determination information field 103, as encapsulation determination information, a value indicating that size information is included (for example, other than '0'). At this time, the encapsulation means 16 may describe, in the encapsulation determination information field 103, different values for each media unit 100 so that the maximum size can be expressed among one or more access units 200 included in the same media unit 100.

For example, in a case in which the size of the access unit 200 exceeds 0 byte and is equal to or smaller than 64 KB (i.e., an expression range of 16 bits), the encapsulation means 16 describes '1' in the encapsulation determination information field 103. At this time, the encapsulation means 16 secures a 16 bit width for a size information field (AU1_length, AU2_length) 104. Further, for example, the size of the access unit 200 exceeds 64 KB and is equal to or smaller than 16 MB (i.e., an expression range of 24 bits), the encapsulation means 16 describes '2' in the encapsulation determination information field 103. Further, the encapsulation means 16 secures a 24 bit width for the size information field 104. Further, for example, the size of the access unit 200 exceeds 16 MB and is equal to or smaller than 4 GB (i.e., an expression range of 32 bits), the encapsulation means 16 describes '3' in the encapsulation determination information field 103. Further, the encapsulation means 16 secures a 32 bit width for the size information field 104.

Then the encapsulation means 16 describes size information of each access unit 200 in the size information field 104 secured by the predetermined bit width. Further, the encapsulation means 16 encapsulates a plurality of access units 200 into the media unit 100 (AU1 and AU2 of FIG. 2(b)).
<Difference Values and Offset Values in Media Unit>

Next, with reference to FIG. 3, the differential values and the offset values described in the media unit 100 will be described (see FIG. 1 as necessary).

Figure 3:
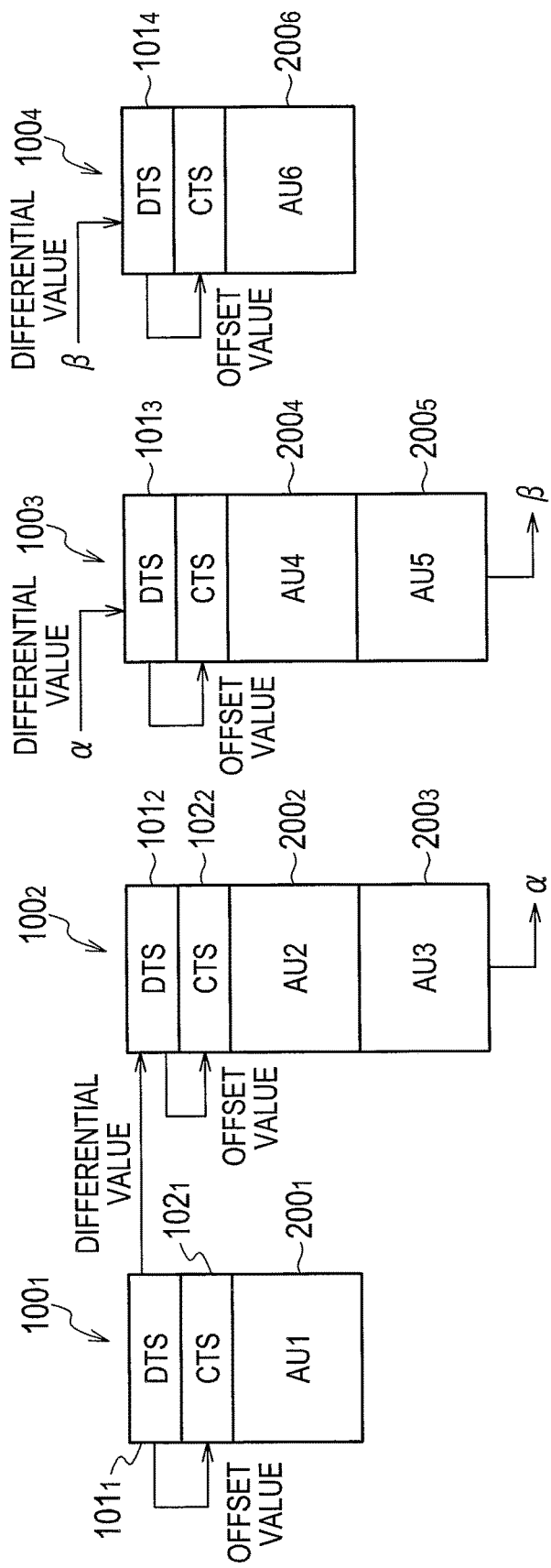
FIG. 3 is a diagram illustrating differential values and offset values in the first embodiment of the present invention.

In this FIG. 3, it is supposed that six access units $200_1$ to $200_6$ have been generated continuously (AU1 to AU6 of FIG. 3). Further, it is supposed that the access unit $200_1$ is encapsulated in a first media unit $100_1$ and the access units $200_2$ and $200_3$ are encapsulated in a second media unit $100_2$. Further, it is supposed that the access units $200_4$ and $200_5$ are encapsulated in a third media unit $100_3$ and the access unit $200_6$ is encapsulated in a fourth media unit $100_4$.

In the media unit $100_1$, since no other preceding access unit exists immediately before the access unit $200_1$, a differential value '0' is described in a DTS field $101_1$. Further, in the media unit $100_1$, an offset value indicating a difference between a DTS and a CTS of the access unit $200_1$ is described in a CTS field $102_1$.

In the media unit $100_2$, a differential value of a DTS of the access unit $200_2$ and the DTS of the access unit $200_1$ is described in a DTS field $101_2$. Further, in the media unit $100_2$, an offset value between the DTS and a CTS of the access unit $200_2$ is described in a CTS field $102_2$.

Here, the differential value between a DTS of the access unit $200_3$ and the DTS of the access unit $200_2$ is identical to the differential value between the DTS of the access unit $200_2$ and the DTS of the access unit $200_1$. Further, the offset value between the DTS and a CTS of the access unit $200_3$ is identical to the offset value of the access unit $200_2$. Therefore, in the media unit $100_2$, the DTS field $101_2$ and the CTS field $102_2$ can be shared by the access units $200_2$ and $200_3$. In other words, since the DTS field 101 and the CTS field 102 are shared in the media unit 100, the media unit 100 is not able to encapsulate access units 200 which have different differential values and offset values.

In the media unit $100_3$, a differential value between a DTS of the access unit $200_4$ and the DTS of the access unit $200_3$ is described in a DTS field $101_3$ (α of FIG. 3). In the media unit $100_4$, a differential value between a DTS of the access unit $200_6$ and a DTS of the access unit $200_5$ is described in a DTS field $101_4$ (β of FIG. 3). In addition, since the media units $100_3$ and $100_4$ are similar to the media units $100_1$ and $100_2$, description thereof will be omitted. Further, in FIG. 3, since a part of the fields of the media unit 100 is not directly related to the present invention, illustration thereof is omitted.

Then, the encoding device 1 transmits, by a transmitting means (not illustrated), the media unit 100 generated by the encapsulation means 16 to the decoding device 2 via the network N. For example, the transmitting means converts the media unit 100 into IP packets, performs transmission path encoding processing and modulation processing in accordance with the network N, and transmits the generated IP packets.

[Configuration of Decoding Device]

Returning to FIG. 1, a configuration of the decoding device 2 will be described (see FIG. 2 and FIG. 3 as necessary). The decoding device 2 extracts one or a plurality of access units 200 from the media unit 100 transmitted by the encoding device 1 and decodes the extracted access units 200. Therefore, the decoding device 2 includes a multicapsule determination means 21, a reverse encapsulation means (i.e., a media unit extraction means) 22, a time stamp reverse calculation means 23 and a decoder 26.

Here, the decoding device 2 receives, by a reception means (not illustrated), a media unit 100 from the encoding device 1 via the network N. For example, the reception means performs demodulation processing and transmission path decoding processing in accordance with the network N and receives the IP packets. Then the reception means extracts a media unit 100 from the received IP packets and sequentially outputs the extracted media unit 100 to the multicapsule determination means 21.

The multicapsule determination means 21 determines whether a plurality of access units 200 have been encapsulated into the media unit 100 based on the input encapsulation determination information field 103 of the media unit 100.

Here, in a case in which the value of the encapsulation determination information field 103 is other than '0' (for example, '1' to '3'), the multicapsule determination means 21 determines that a plurality of access units 200 have been encapsulated into the media unit 100. On the other hand, in a case in which the value of the encapsulation determination information field 103 is '0,' the multicapsule determination means 21 determines that a plurality of access units 200 have not been encapsulated into the media unit 100. Then the multicapsule determination means 21 sequentially outputs, to a reverse encapsulation means 22, the determination result indicating whether a plurality of access units 200 have been encapsulated and the media unit 100.

When the determination result of the multicapsule determination means 21 shows that a plurality of access units 200 have not been encapsulated, the reverse encapsulation means 22 extracts (i.e., reverse encapsulates) one access unit 200 from the input media unit 100. In this case, since one access unit 200 can be extracted when the entire media unit 100 is read, it is not necessary for the reverse encapsulation means 22 to refer to the size information field 104. The entire size of the media unit 100 can be specified by the reception means described above from a length information field included in a UDP header of the IP packet, for example.

Further, when the determination result of the multicapsule determination means 21 shows that a plurality of access units 200 have been encapsulated, the reverse encapsulation means 22 extracts a plurality of access units 200 from the input media unit 100. In this case, it is necessary for the reverse encapsulation means 22 to specify, with reference to the size information field 104, a data field of the media unit 100 into which each access unit 200 is encapsulated.

Then the reverse encapsulation means 22 extracts, from the media unit 100, the differential value described in the DTS field 101 and the offset value described in the CTS field 102. Then the reverse encapsulation means 22 sequentially outputs, to the time stamp reverse calculation means 23, the access unit 200, the differential value and the offset value extracted from the media unit 100.

The time stamp reverse calculation means 23 reversely calculates the DTS and the CTS of the access unit 200 from a time stamp (i.e., a differential value and an offset value) and includes a DTS reverse calculation means 24 and a CTS reverse calculation means 25. The DTS reverse calculation means 24 performs reverse operation of the differential value calculation means 13. The CTS reverse calculation means 25 performs reverse operation of the offset value calculation means 14.

<Reverse Calculation of DTS and CTS>

Returning to FIG. 3, the reverse calculation of the DTS by the DTS reverse calculation means 24 and the reverse calculation of the CTS by the CTS reverse calculation means 25 will be described (see FIG. 1 as necessary).

In the first media unit $100_1$, since no other preceding access unit exists immediately before the access unit $200_1$ and, therefore, '0' is described in the DTS field $101_1$ as the differential value. Therefore, the DTS reverse calculation means 24 performs the reverse calculation with an absolute value of the DTS of the access unit $200_1$ being '0'. At this time, since the DTS reverse calculation means 24 performs processing to the access units 200 which are continuous in the time direction, the DTS reverse calculation means 24 temporarily stores the value of reversely calculated DTS in an unillustrated memory as a DTS of the latest access unit (i.e., another access unit) $200_1$. The CTS reverse calculation means 25 adds the offset value described in the CTS field $102_1$ as it is to the value of the reversely calculated DTS in the access unit $200_1$ and then reversely calculates as a CTS of the access unit $200_1$.

In the second media unit $100_2$, the differential value between the DTS of the access unit $200_2$ and the DTS of the access unit $200_1$ is described in the DTS field $101_2$. Therefore, the DTS reverse calculation means 24 reversely calculates, as the DTS of the access unit $200_2$, a value obtained by adding the DTS of the access unit $200_1$ temporarily stored in the memory and the differential value described in the DTS field $101_2$. Then the DTS reverse calculation means 24 temporarily stores, in the memory described above, the value of the reversely calculated DTS of the access unit $200_2$ and updates memory content. That is, in this memory, each time the DTS of the latest access unit 200 included in the media unit 100 is reversely calculated, the temporarily stored DTS is updated. Further, the CTS reverse calculation means 25 reversely calculates, as the CTS of the access unit $200_2$, a value obtained by adding the offset value described in the CTS field $102_2$ and the DTS of the access unit $200_2$ reversely calculated by the DTS reverse calculation means 24.

Here, the second media unit $100_2$ further includes the access unit $200_3$. Therefore, the DTS reverse calculation means 24 and the CTS reverse calculation means 25 reversely calculate the DTS and the CTS of the access unit $200_3$, respectively. That is, the DTS reverse calculation means 24 adds the differential value described in the DTS field $101_2$ to the value of the DTS temporarily stored in the memory (i.e., the value of the DTS of the access unit $200_2$) and reversely calculates the DTS of the access unit $200_3$. Further, the CTS reverse calculation means 25 adds the value of the DTS reversely calculated by the DTS reverse calculation means 24 to the offset value described in the CTS field $102_2$ and reversely calculates the CTS of the access unit $200_3$.

Since processing in the media units $100_3$ and $100_4$ is similar to that of the media units $100_1$ and $100_2$, description thereof will be omitted. Then the time stamp reverse calculation means 23 correlates the DTS reversely calculated by the DTS reverse calculation means 24 and the CTS reversely calculated by the CTS reverse calculation means 25 with the access unit 200 and outputs the correlated result to the decoder 26.

Returning to FIG. 1, description about the configuration of the decoding device 2 will be continued. The decoder 26 decodes the access unit 200 input from the time stamp reverse calculation means 23 according to an image decoding scheme corresponds to the encoder 11 (for example, MPEG-2 Video or MPEG-4 AVC). Since both the CTS and the DTS are correlated with the access unit 200, this access unit 200 can be decoded according to the image decoding scheme described above.

[Operation of Encoding Device]

Figure 4:
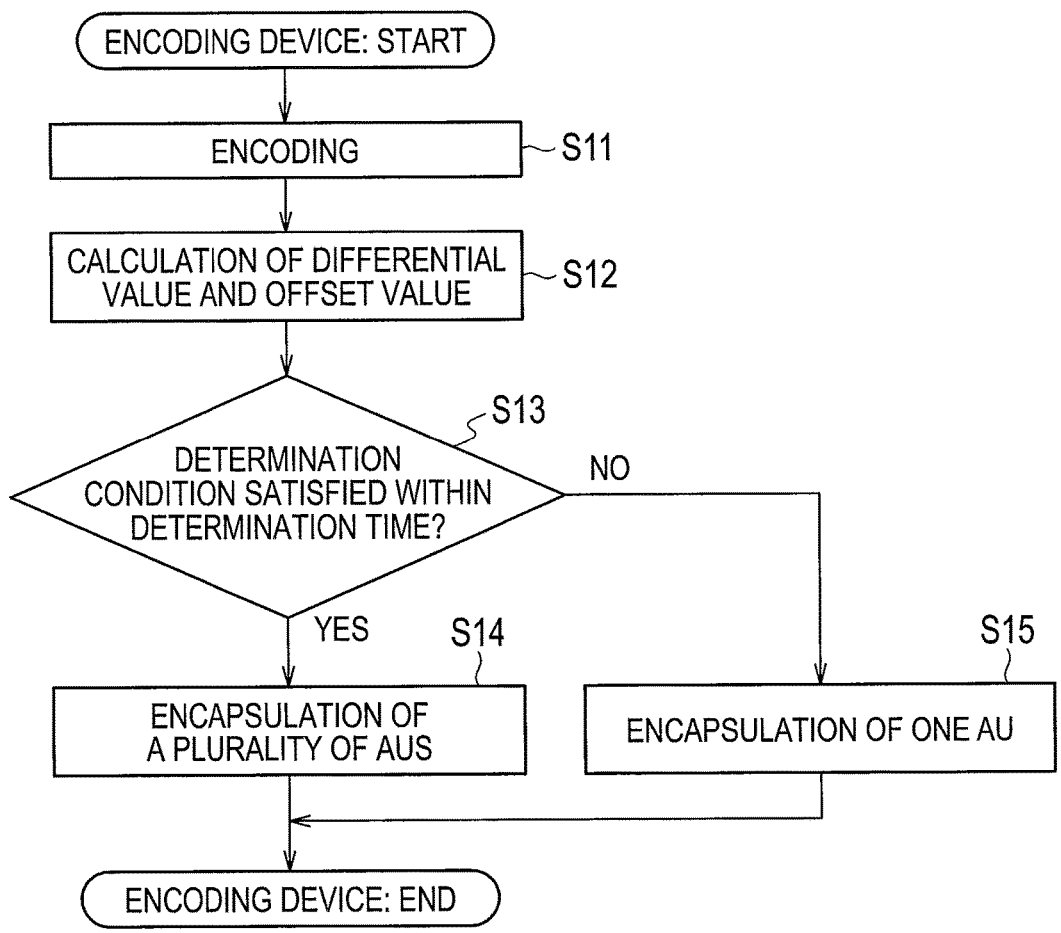
FIG. 4 is a flowchart illustrating an operation of the encoding device of FIG. 1.

An operation of the encoding device 1 will be described with reference to FIG. 4 (see FIG. 1 to FIG. 3 as necessary). The encoding device 1 encodes, by the encoder 11, an image signal input from outside to generate an access unit 200 correlated with a CTS and a DTS (step S11).

The encoding device 1 calculates, by the differential value calculation means 13, a differential value of the DTS for each access unit 200. Further, the encoding device 1 calculates, by the offset value calculation means 14, an offset value between the DTS and the CTS for each access unit 200 (step S12).

The encoding device 1 determines, by the encapsulation determination means 15, whether a plurality of access units 200 satisfy a determination condition within determination time (step S13). Here, in a case in which a plurality of access units 200 satisfy a determination condition (step S13: Yes), the encoding device 1 determines these plurality of access units 200 as an encapsulation unit and proceeds to a process of step S14.

The encoding device 1 describes, by the encapsulation means 16, a differential value and an offset value in the media unit 100. Further, the encoding device 1 encapsulates, by the encapsulation means 16, a plurality of access units 200 included in the encapsulation unit into the media unit 100. Further, the encoding device 1 describes, by the encapsulation means 16, encapsulation determination information (for example, any of '1' to '3') and size information in the media unit 100 (step S14).

On the other hand, in a case in which one access unit 200 satisfies the determination condition (step S13: No), the encoding device 1 determines this one access unit 200 as an encapsulation unit and proceeds to a process of step S15.

The encoding device 1 describes, by the encapsulation means 16, a differential value and an offset value in the media unit 100. Further, the encoding device 1 encapsulates, by the encapsulation means 16, one access unit 200 included in the encapsulation unit into the media unit 100. The encoding device 1 describes, by the encapsulation means 16, encapsulation determination information (for example, '0') in the media unit 100 (step S15).

[Operation of Decoding Device]

Figure 5:
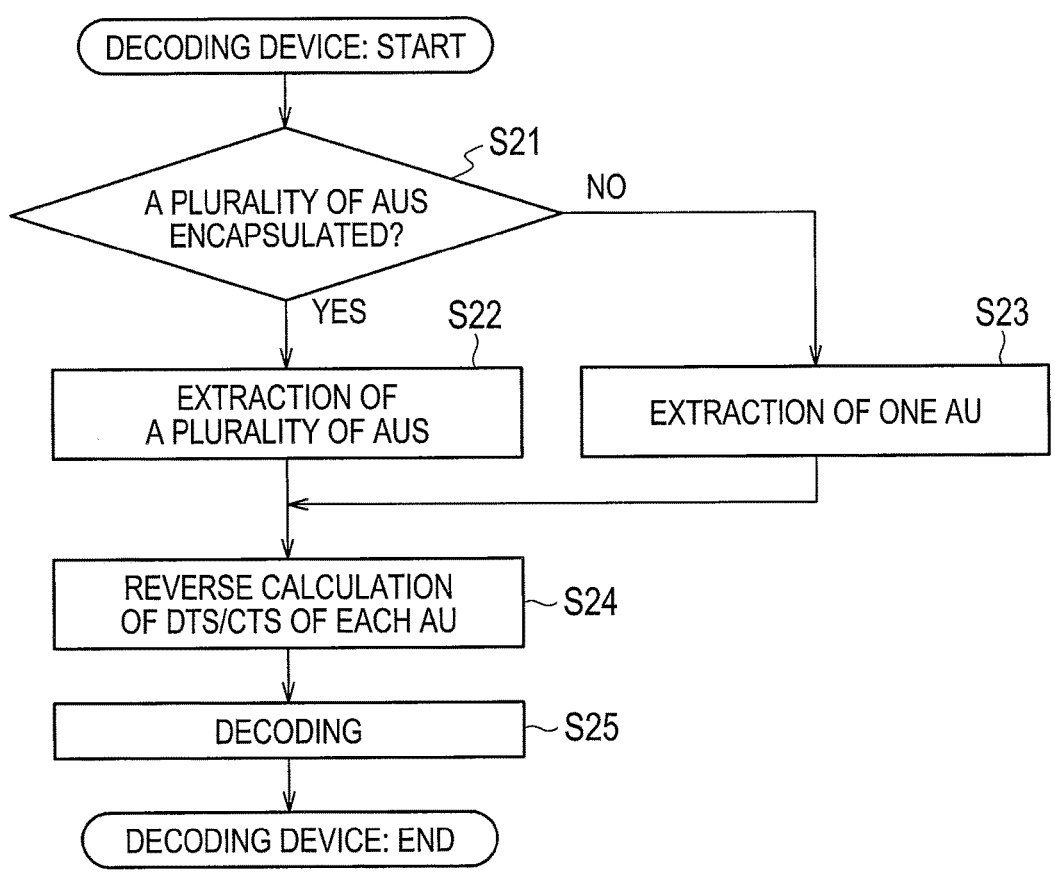
FIG. 5 is a flowchart illustrating an operation of the decoding device of FIG. 1.

An operation of the decoding device 2 will be described with reference to FIG. 5 (see FIG. 1 to FIG. 3 as necessary). The decoding device 2 determines, by the multicapsule determination means 21, whether a plurality of access units 200 are encapsulated into the media unit 100 based on encapsulation determination information described in the media unit 100 input from the encoding device 1 (step S21).

Here, in a case in which a plurality of access units 200 are encapsulated (step S21: Yes), the decoding device 2 proceeds to a process of step S22. The decoding device 2 extracts, by the reverse encapsulation means 22, a plurality of access units 200 from the input media unit 100 based on size information (step S22).

On the other hand, in a case in which a plurality of access units 200 are not encapsulated (step S21: No), the decoding device 2 proceeds to a process of step S23. The decoding device 2 extracts, by the reverse encapsulation means 22, one access unit 200 from the input media unit 100 (step S23).

The decoding device 2 reversely calculates, by the DTS reverse calculation means 24, a DTS of the access unit 200. Further, the decoding device 2 reversely calculates, by the CTS reverse calculation means 25, a CTS of the access unit 200 (step S24). The decoding device 2 decodes, by the decoder 26, the access unit 200 of which DTS and CTS have been reversely calculated (step S25).

As described above, in the encoding device 1 and the decoding device 2 according to the first embodiment of the present invention, even in a case in which a plurality of access units 200 are encapsulated, only one field indicating decoding timing (for the differential value of the DTS) and only one field indicating decoding timing (for the offset value) are included in the media unit 100 (FIG. 2(*b*)). Further, in a case in which one access unit 200 is encapsulated, the encoding device 1 and the decoding device 2 include no size information field in the media unit (FIG. 2(*a*)). In this manner, since no redundant field is included in the media unit 100, the encoding device 1 and the decoding device 2 can reduce overheads in this media unit 100 and encapsulation can be performed in an optimum format. Especially the encoding device 1 and the decoding device 2 can substantially reduce overheads in the media unit 100 compared with a case in which the fields of the DTS and the CTS are simply added to each access unit 200.

Further, the encoding device 1 secures the size information field 104 with the number of bits in accordance with the size of the access unit 200. Therefore, the encoding device 1 can avoid a situation in which this size information field 104 becomes redundant and a situation in which the number of bits of the size information field 104 becomes insufficient.

Further, even in a case in which a plurality of access units 200 are encapsulated, the decoding device 2 can correctly specify a data field of each access unit 200 encapsulated into the media unit 100 by referring to the size information field 104. Therefore, the decoding device 2 can prevent data missing during extraction of the access unit 200.

Second Embodiment

With reference to FIG. 6, a content providing system 1000A according to a second embodiment of the present invention will be described with respect to a difference from the first embodiment. The content providing system 1000A provides content (i.e., audio) and includes an encoding device 1A and a decoding device 2A.

[Configuration of Encoding Device]

The encoding device 1A encodes an audio signal as an input signal and provides the encoded audio signal to the decoding device 2A.

Therefore, the encoding device 1A includes an encoder 11A, a time stamp calculation means 12A, an encapsulation determination means 15A and an encapsulation means 16A.

The encoder 11A generates an access unit correlated with a CTS by encoding an audio signal input from outside according to an encoding scheme in which the CTS is used.

Here, the encoder 11A encodes the input audio signal using an audio encoding scheme, such as MPEG-2 AAC (Advanced Audio Coding), and generates an audio access unit. Here, in a case in which a decoding order and a presentation order of the access unit are identical to each other as in the case of the audio signal, only the CTS is correlated with each access unit. Then the encoder 11A outputs, to the time stamp calculation means 12A, the access unit correlated with the CTS.

The time stamp calculation means 12A calculates a time stamp to be added to a media unit (i.e., a differential value of the CTS) and includes a differential value calculation means 13A.

The differential value calculation means 13A calculates, for each access unit, a differential value between the CTS of the access unit and the CTS of another access unit encapsulated in the immediately preceding media unit. Since the differential value calculation means 13A is similar to the differential value calculation means 13 of FIG. 1 except that the CTS is used instead of the DTS, detailed description of the differential value calculation means 13A will be omitted.

The encapsulation determination means 15A determines, as an encapsulation unit, one or more access units which satisfy a later-described determination condition within determination time among the access units input from the time stamp calculation means 12A. Since the encapsulation determination means 15A is similar to the encapsulation determination means 15 of FIG. 1 except that a determination condition in which differential values are the same is used, detailed description of the encapsulation determination means 15A will be omitted.

The encapsulation means 16A encapsulates (i.e., stores), in a media unit, one or more access units included in the encapsulation unit determined by the encapsulation determination means 15A and adds the same differential values to the media unit.

Figure 7A:
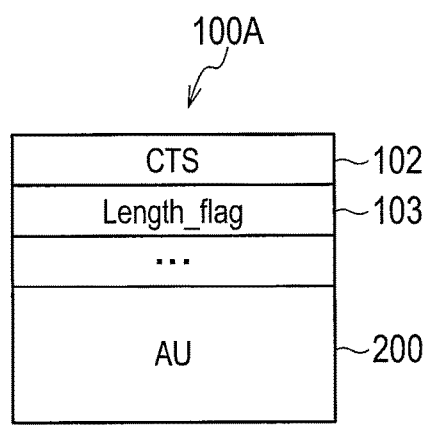
FIG. 7(a) is a diagram illustrating a format of a media unit in which one access unit is encapsulated in the second embodiment of the present invention and FIG. 7(b) is a diagram illustrating a format of a media unit in which a plurality of access units are encapsulated in the second embodiment of the present invention.
Figure 7B:
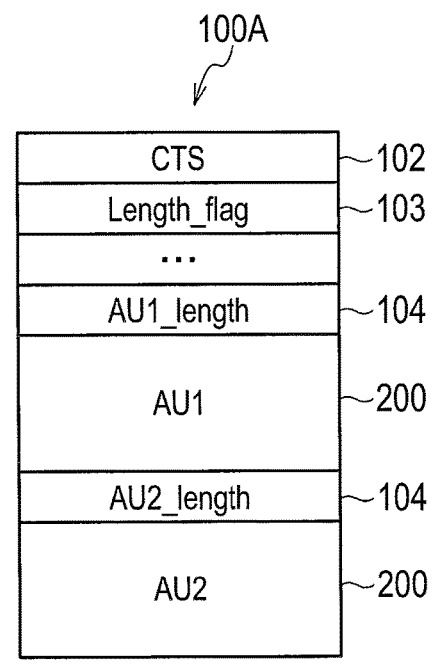

In the present embodiment, since the audio signal is encoded, the DTS is not correlated with the access unit 200 but only the CTS is correlated with the access unit 200. Therefore, as illustrated in FIGS. 7(*a*) and 7(*b*), no DTS field exists in the media unit 100A output by the encapsulation means 16A but only a CTS field 102 exists in that media unit 100A. Then, as illustrated in FIG. 8, a differential value of the CTS calculated by the differential value calculation means 13A is described in the CTS field 102 of this media unit 100A. In addition, since the encapsulation means 16A is similar to the encapsulation means 16 of FIG. 1, detailed description of the encapsulation means 16A will be omitted.

[Configuration of Decoding Device]

Hereinafter, a configuration of the decoding device 2A will be described. The decoding device 2A extracts one or a plurality of access units 200 from the media unit 100A transmitted by the encoding device 1A and decodes the extracted access units 200. Therefore, the decoding device 2A includes a multicapsule determination means 21, a reverse encapsulation means (i.e., a media unit extraction means) 22, a time stamp reverse calculation means 23A and a decoder 26A.

The time stamp reverse calculation means 23A reversely calculates a CTS corresponding to the access unit 200 from a time stamp (i.e., a differential value of the CTS) and includes a CTS reverse calculation means 25A. The CTS reverse calculation means 25A reversely calculates, as a CTS of this access unit 200, a value obtained by adding a differential value added to the media unit 100A and a CTS of another access unit located immediately before the access unit 200. Since the CTS reverse calculation means 25A is similar to the DTS reverse calculation means 24 of FIG. 1 except that the CTS is used instead of the DTS, detailed description of the CTS reverse calculation means 25A will be omitted.

The decoder 26A decodes the access unit 200 input from the time stamp reverse calculation means 23A according to an audio decoding scheme corresponding to the encoder 11A (for example, MPEG-2 AAC). Since the CTS is correlated with the access unit 200, this access unit 200 can be decoded according to the audio decoding scheme described above. Since the DTS is not correlated with the decoder 26A, the decoder 26A performs decoding considering that the DTS and the CTS are identical to each other.

As described above, in the encoding device 1A and the decoding device 2A according to the second embodiment of the present invention, the same effect as that of the first embodiment can be obtained for the audio content.

Third Embodiment

Commonization of Media Unit, Switching of Transmission Paths

Figure 9:
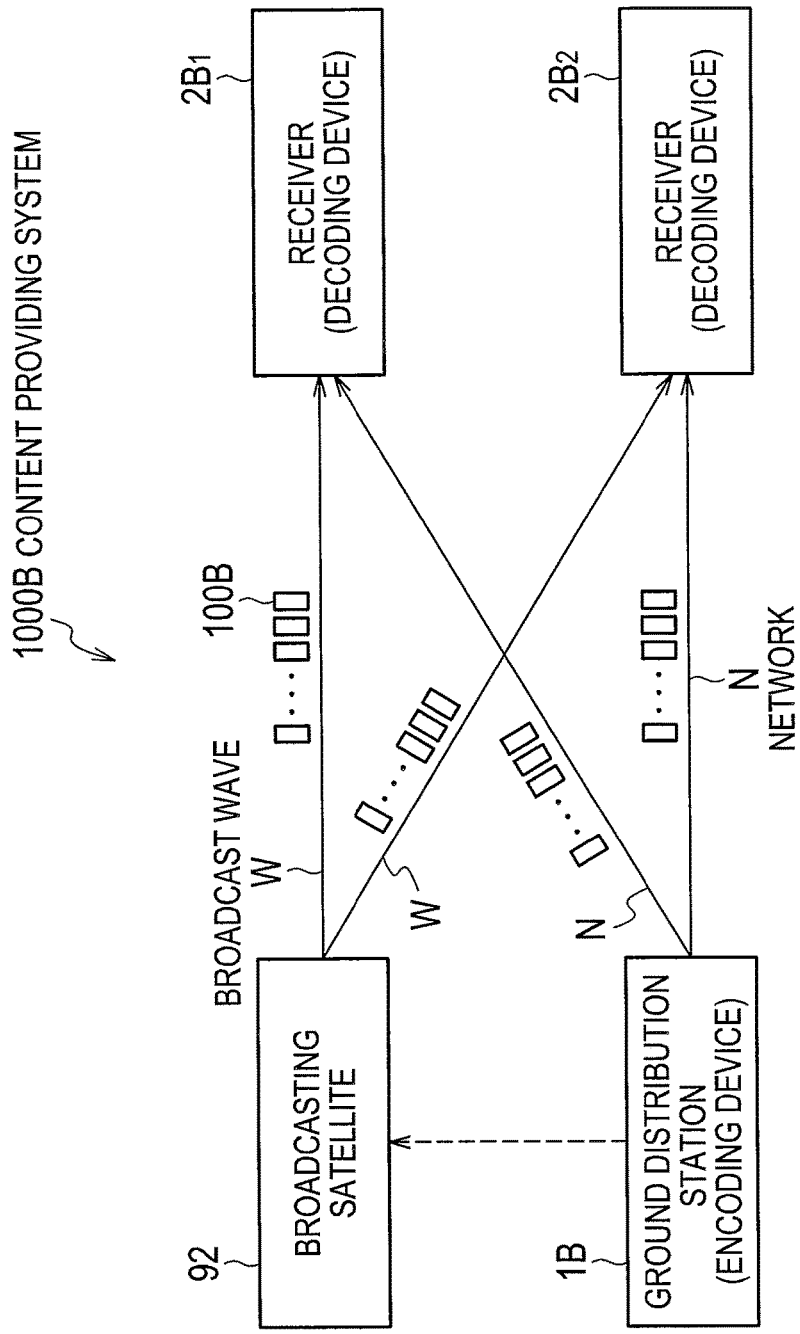
FIG. 9 is an explanatory view illustrating commonization of media units and switching of transmission paths in a third embodiment of the present invention.

With reference to FIG. 9, commonization of a media unit 100B and switching of transmission paths will be described. As illustrated in FIG. 9, a content providing system 1000B provides content (i.e., images) and includes a ground distribution station (i.e., an encoding device) 1B, two receivers (i.e., decoding devices) $2B_1$ and $2B_2$, and a broadcasting satellite 92.

The ground distribution station 1B transmits a media unit 100B in which the content is stored to the receivers $2B_1$ and $2B_2$ via a network N. The receivers $2B_1$ and $2B_2$ receive the media unit 100B from the ground distribution station 1B via the network N and reproduce the content. Further, the receivers $2B_1$ and $2B_2$ receive the media unit 100B from the broadcasting satellite 92 via a broadcast wave W and reproduce the content.

The broadcasting satellite 92 receives (i.e., uplinks) the media unit 100B from an unillustrated uplink station. Then the broadcasting satellite 92 transmits (i.e., downlinks) the received media unit 100 to the receivers $2B_1$ and $2B_2$ via the broadcast wave W.

In this manner, a transmission path by the network N is established between the ground distribution station 1B and the receiver $2B_1$ and between the ground distribution station 1B and the receiver $2B_2$. Further, a transmission path by the broadcast wave W is established between the broadcasting satellite 92 and the receiver $2B_1$ and between the broadcasting satellite 92 and the receiver $2B_2$.

First, commonization of the media unit 100B will be described. A case in which the same content is provided from the ground distribution station 1B to both the receivers $2B_1$ and $2B_2$ in a conventional system will be considered. In the conventional system, a DTS and a CTS are included in each media unit in the form of absolute time. Therefore, in the conventional system, there has been a problem that it is necessary to prepare media units corresponding to each of the receivers $2B_1$ and $2B_2$ and thus processing load becomes high.

Next, switching of the transmission paths will be described. For example, a case will be considered in which, when the broadcasting satellite 92 is transmitting the media unit to the receiver $2B_1$, the transmission path is switched from the broadcast wave W to the network N due to rainfall attenuation and the media unit 100B is transmitted from the ground distribution station 1B. In the conventional system, the DTS and the CTS are included in the media unit in the form of the absolute time. Therefore, in the conventional system, there has been a problem that it is necessary to prepare media units for each transmission path, such as the broadcast wave W and the network N, and thus the processing load becomes high.

Then, an object of the invention of this application is to solve the problems described above and to provide a ground distribution station (i.e., an encoding device), a receiver (i.e., a decoding device) and programs therefor that are capable of encapsulating in an optimum format.

In view of the problem described above, the content providing system 1000B adopts a format to add the base absolute time of the DTS and the CTS to a control signal (not illustrated) and to add a DTS relative value and a CTS relative value to an access unit (not illustrated).

Thus, in the content providing system 1000B, if control signals corresponding to each of the receivers $2B_1$ and $2B_2$ are prepared, the same media unit 100B can be used in common by the receivers $2B_1$ and $2B_2$. That is, the media unit 100B can be used as the minimum usage unit of the image medium and the audio medium.

Further, in the content providing system 1000B, since the format described above is adopted, if the control signals are prepared for each transmission path, the same media unit 100B can be transmitted to the receiver $2B_1$ while switching the transmission paths.

[Configuration of Encoding Device]

Figure 10:
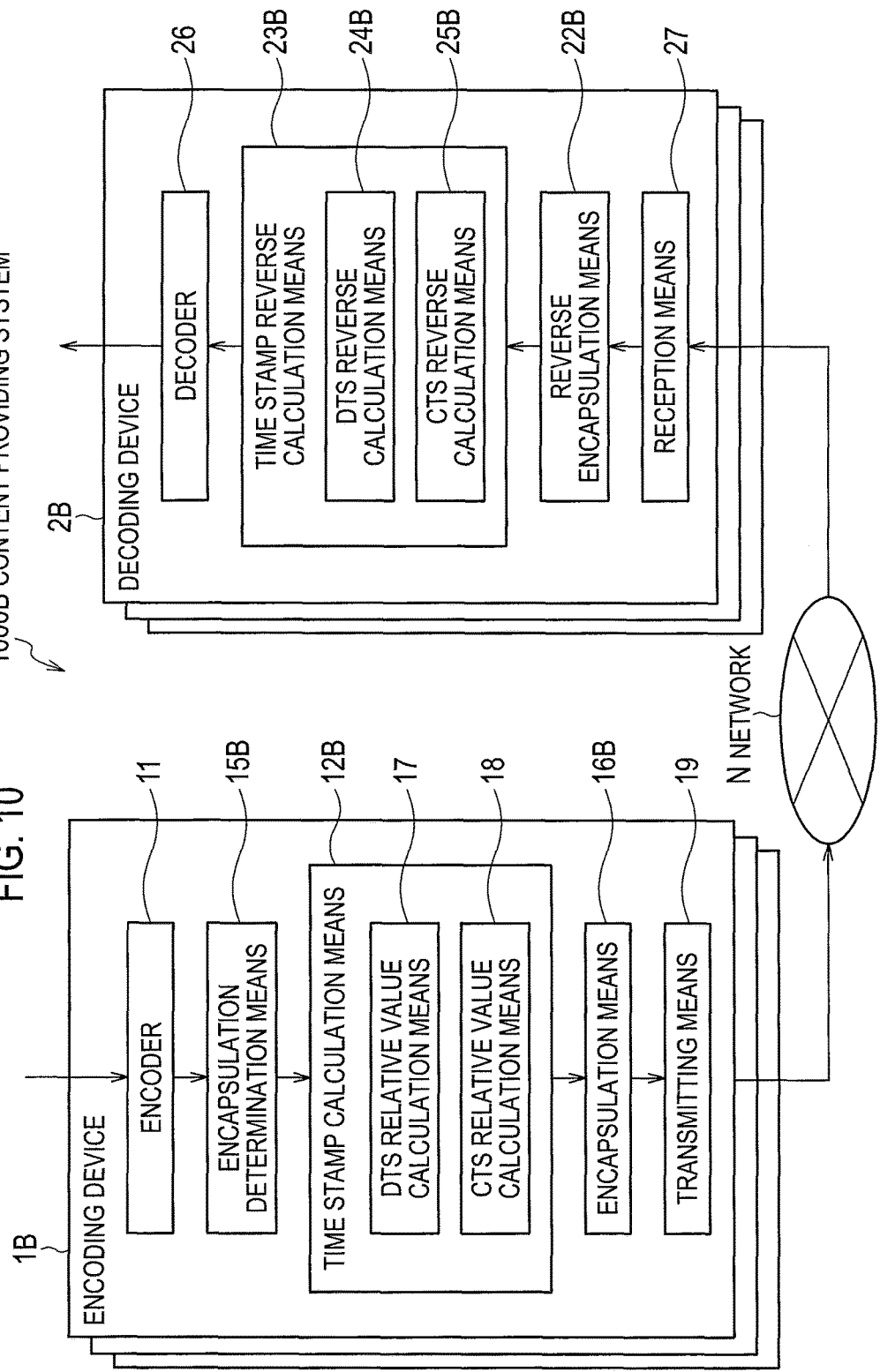
FIG. 10 is a block diagram illustrating configurations of an encoding device and a decoding device according to the third embodiment of the present invention.

A configuration of an encoding device 1B will be described with reference to FIG. 10. The encoding device 1B encodes an image signal as an input signal and provides the encoded image signal to a decoding device 2B. Therefore, the encoding device 1B includes an encoder 11, a time stamp calculation means 12B, an encapsulation determination means 15B, and an encapsulation means 16B and a transmitting means 19. Although a network N is illustrated as the transmission path in this FIG. 10, the transmission path may instead be a broadcast wave W.

The encoder 11 generates an access unit with (to) which a CTS and a DTS are correlated (added) by encoding an image signal input from outside according to an encoding scheme in which the CTS and the DTS are used. Then the encoder 11 sequentially outputs, to the encapsulation determination means 15B, the access unit correlated with the CTS and the DTS.

The encapsulation determination means 15B determines, as encapsulation unit, one or more access units input from the encoder 11 on a predetermined encapsulation condition. Then the encapsulation determination means 15B outputs the access units to the time stamp calculation means 12B in an order in which the access units have been encoded for each encapsulation unit.

This encapsulation condition is a condition which can be set arbitrarily: for example, a predetermined number of access units are defined as an encapsulation unit, or access units encoded within predetermined time are defined as an encapsulation unit. For example, if a delay is to be reduced, the encapsulation condition is set in advance with one access unit being defined as an encapsulation unit. Further, the encapsulation condition may be set in advance with, in the case of image signals, the number of access units corresponding to GOP (Group of Picture) (for example, 15) being defined as an encapsulation unit.

The time stamp calculation means 12B calculates time stamps (i.e., the DTS relative value and the CTS relative value) for each access unit and includes a DTS relative value calculation means 17 and a CTS relative value calculation means 18.

The DTS relative value calculation means 17 calculates '0' as a DTS relative value of the access unit which is encoded first. Further, the DTS relative value calculation means 17 calculates, as a DTS relative value of the access unit which is encoded second or thereafter, a difference between the DTS of this access unit and the DTS of another access unit encoded immediately before this access unit.

The CTS relative value calculation means 18 calculates, as the CTS relative value of the access unit, a difference between the CTS of this access unit and the CTS of another access unit encoded immediately after this access unit. Details of the DTS relative value calculation means 17 and the CTS relative value calculation means 18 will be described later.

Then, the time stamp calculation means 12B outputs, to the encapsulation means 16B, the access units input from the encapsulation determination means 15B, the DTS relative value calculated by the DTS relative value calculation means 17, and the CTS relative value calculated by the CTS relative value calculation means 18 in an order of encoding in each encapsulation unit.

The encapsulation means 16B encapsulates the access units input from the time stamp calculation means 12B into the media unit 100B in an order of encoding in each encapsulation unit. Further, the encapsulation means 16B adds the DTS relative value and the CTS relative value to each access unit and outputs the encapsulated media unit 100B to the transmitting means 19.

The transmitting means 19 transmits the media unit 100B input from the encapsulation means 16B and a control signal 300 to the decoding device 2B via the network N.

The control signal 300 includes absolute time which indicates the head of the media unit 100B. For example, the control signals 300 is information indicating a configuration of content and an acquisition source of a necessary component, and start-up control meta data in which absolute time is described (see the reference). As the absolute time, for example, the time of UTC (Coordinated Universal Time) or elapsed time based on the head of the content is set in advance. Reference: Aoki et al., "Media Transport System in Hybrid Broadcasting" Information Processing Society of Japan Research Report, 2011.

Here, it is desirable that the transmitting means 19 adds an ID (identifier) and a sequence number to the media unit 100B and the control signal 300 corresponding to the media unit 100B. That is, an ID is set in advance in each transmission path and the transmitting means 19 adds, to the media unit 100B and to the control signal 300, an ID in accordance with the transmission path along which the media unit 100B is transmitted. Further, transmitting means 19 includes a management table (not illustrated) with which a sequence number already added to the media unit 100B is managed. Then the transmitting means 19 increments the sequence number of this management table and adds the incremented sequence number as a sequence number of a new media unit 100B.

The ID is identification information which is common in predetermined media units 100B. For example, since the same value is given to the media unit 100B of the same transmission path, the ID is a unique value which neither overlaps other distribution environments nor depends on the distribution environment. The sequence number is identification information specific to each media unit 100B. That is, each media unit 100B can be uniquely identified by a set of the ID and the sequence number.

<Concrete Example of Encapsulation>

Figure 11:
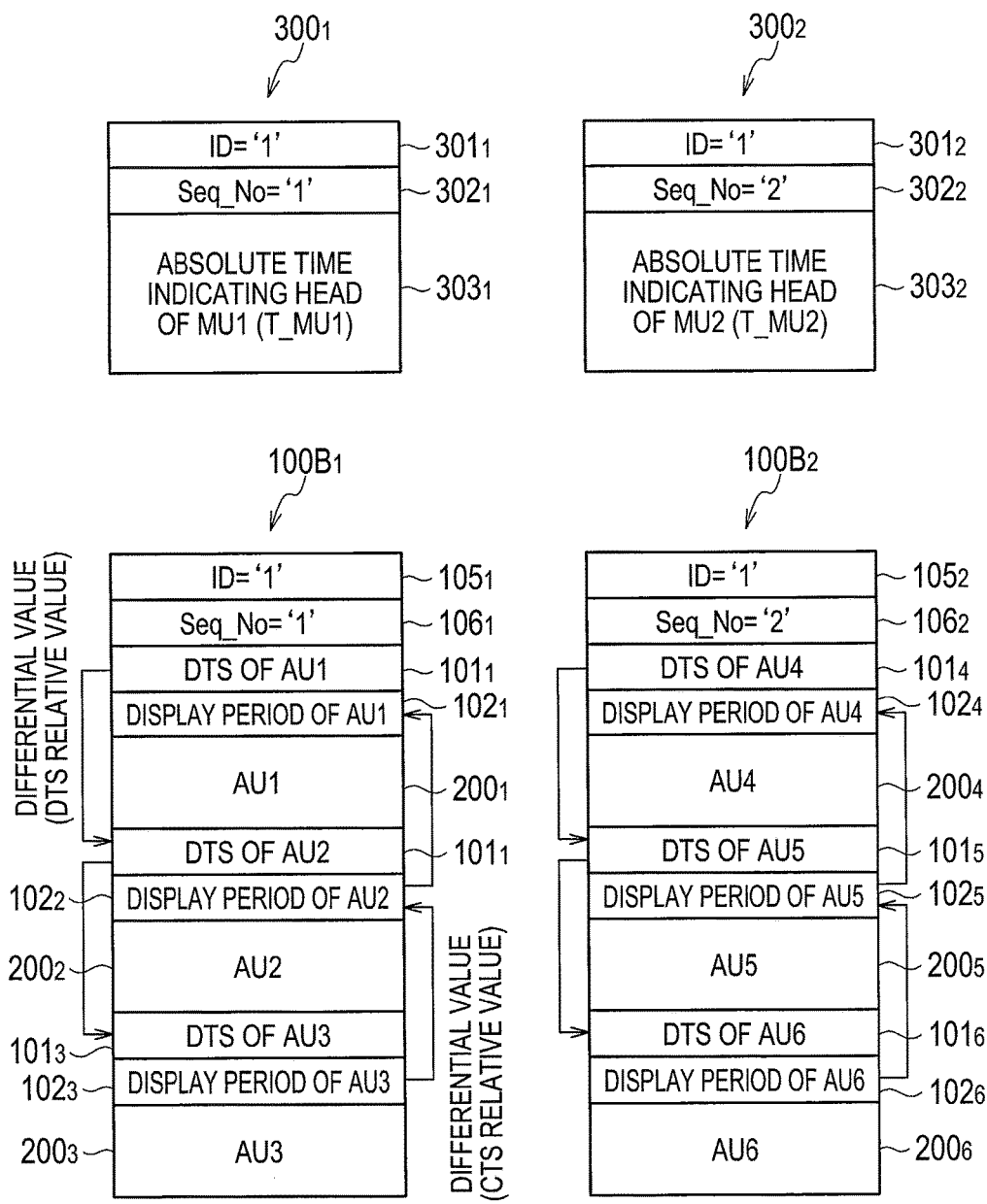
FIG. 11 is a diagram illustrating a format of a media unit in which a plurality of access units are encapsulated and a control signal in the third embodiment of the present invention.

With reference to FIG. 11, a concrete example of encapsulation by the encoding device 1B will be described. In FIG. 11, the CTS field 102 is illustrated as an "AU display period" and a sequence number field 106 is illustrated as "Seq_No."

In this FIG. 11, it is supposed that six access units $200_1$ to $200_6$ have been generated continuously (AU1 to AU6 of FIG. 11). Further, in FIG. 11, it is supposed that an encapsulation condition has been set with three access units 200 being defined as an encapsulation unit. Therefore, the encapsulation determination means 15B determines the encapsulation unit of the first media unit $100B_1$ as the access units $200_1$ to $200_3$ and determines the encapsulation unit of the second media unit $100B_2$ as the access units $200_4$ to $200_6$. Further, in FIG. 11, it is supposed that the media units $100B_1$ and $100B_2$ and control signals $300_1$ and $300_2$ corresponding to these media units $100B_1$ and $100B_2$ are transmitted along the same transmission path.

The DTS relative value calculation means 17 calculates '0' as the DTS relative value of the head access unit $200_1$ and describes '0' in the DTS field $101_1$. Further, the DTS relative value calculation means 17 calculates, as the DTS relative value of the second access unit $200_2$, a difference between the DTS of this access unit $200_2$ and the DTS of the head access unit $200_1$, and describes the calculated value in the DTS field $101_2$. Further, the DTS relative value calculation means 17 calculates, as the DTS relative value of the third access unit $200_3$, a difference between the DTS of this access unit $200_3$ and the DTS of the second access unit $200_2$, and describes the calculated value in the DTS field $101_3$.

Here, the DTS relative value calculation means 17 calculates a DTS relative value between the access units $200_3$ and $200_4$ encapsulated in the different media units $100B_1$ and $100B_2$ if these media units $100B_1$ and $100B_2$ have the same ID. That is, the DTS relative value calculation means 17 calculates, as a DTS relative value of the fourth access unit $200_4$, a difference between the DTS of this access unit $200_4$ and the DTS of the third access unit $200_3$ and describes the calculated difference in the DTS field $101_4$.

Further, the DTS relative value calculation means 17 calculates, as a DTS relative value of fifth access unit $200_5$, a difference between the DTS of this access unit $200_5$ and the DTS of the fourth access unit $200_4$ and describes the calculated value in a DTS field $101_5$. Further, the DTS relative value calculation means 17 calculates, as a DTS relative value of sixth access unit $200_6$, a difference between the DTS of this access unit $200_6$ and the DTS of the fifth access unit $200_5$ and describes the calculated value in a DTS field $101_6$.

That is, the DTS relative value calculation means 17 calculates the DTS relative values as illustrated in following Expression (1) to (6) and describes the calculated DTS relative values in the DTS field 101.

| | |
|---|---|
| AU1_DTS relative value=0 | Expression (1) |
| AU2_DTS relative value=AU2_DTS-AU1_DTS | Expression (2) |
| AU3_DTS relative value=AU3_DTS-AU2_DTS | Expression (3) |
| AU4_DTS relative value=AU4_DTS-AU3_DTS | Expression (4) |
| AU5_DTS relative value=AU5_DTS-AU4_DTS | Expression (5) |
| AU6_DTS relative value=AU6_DTS-AU5_DTS | Expression (6) |

The CTS relative value calculation means 18 calculates, as a CTS relative value of the head access unit $200_1$, a difference between the CTS of this access unit $200_1$ and the CTS of the second access unit $200_2$ and describes the calculated value in the CTS field $102_1$. Further, the CTS relative value calculation means 18 calculates, as a CTS relative value of the second access unit $200_2$, a difference between the CTS of this access unit $200_2$ and the CTS of the third access unit $200_3$ and describes the calculated value in the CTS field $102_2$.

Here, the CTS relative value calculation means 18 calculates a CTS relative value between the access units $200_3$ and $200_4$ encapsulated in the different media units $100B_1$ and $100B_2$ if these media units $100B_1$ and $100B_2$ have the same ID. That is, the CTS relative value calculation means 18 calculates, as a CTS relative value of the third access unit $200_3$, a difference between the CTS of this access unit $200_3$ and the CTS of the fourth access unit $200_4$ and describes the calculated value in a CTS field $102_3$.

Further, the CTS relative value calculation means 18 calculates, as a CTS relative value of the fourth access unit $200_4$, a difference between the CTS of this access unit $200_4$ and the CTS of the fifth access unit $200_5$ and describes the calculated value in a CTS field $102_4$. Further, the CTS relative value calculation means 18 calculates, as a CTS relative value of the fifth access unit $200_5$, a difference between the CTS of this access unit $200_5$ and the CTS of the sixth access unit $200_6$ and describes the calculated value in a CTS field $102_5$.

Further, the CTS relative value calculation means 18 calculates, as a CTS relative value of the sixth access unit $200_6$, a difference between the CTS of this access unit $200_6$ and the CTS of a seventh access unit 200 (not illustrated) and describes the calculated value in a CTS field $102_6$. In a case in which the sixth access unit $200_6$ is the last access unit, it is only necessary for the CTS relative value calculation means 18 to consider any of the time when the input signal is interrupted, when the encoder 11 stops its operation and when time is out as the CTS of the seventh access unit 200 and to calculate a CTS relative value.

That is, the CTS relative value calculation means 18 calculates the CTS relative values as expressed in the following expressions (7) to (12) and describes the calculated CTS relative values in the CTS field 102.

| | |
|---|---|
| AU1_CTS relative value=AU2_CTS-AU1_CTS | Expression (7) |
| AU2_CTS relative value=AU3_CTS-AU2_CTS | Expression (8) |
| AU3_CTS relative value=AU4_CTS-AU3_CTS | Expression (9) |
| AU4_CTS relative value=AU5_CTS-AU4_CTS | Expression (10) |

AU5_CTS relative value=AU6_CTS-AU5_CTS    Expression (11)

AU6_CTS relative value=AU7_CTS-AU6_CTS    Expression (12)

The transmitting means 19 describes an ID common in the media units 100B$_1$ and 100B$_2$ and the control signals 300$_1$ and 300$_2$ (for example, '1') in ID fields 105$_1$ and 105$_2$ of the media units 100B$_1$ and 100B$_2$ and in ID fields 301$_1$ and 301$_2$ of the control signals 300$_1$ and 300$_2$.

Further, the transmitting means 19 describes a sequence number of the media unit 100B$_1$ (for example, '1') in a sequence number field 106$_1$ of the media unit 100B$_1$ and in a sequence number field 302$_1$ of the control signal 300$_1$ corresponding to the media unit 100B$_1$.

Further, the transmitting means 19 describes absolute time indicating the head of the media unit 100B$_1$ (i.e., absolute time indicating the head of MU1 (T_mu1)) in an absolute time field 303$_1$ of the control signal 300$_1$.

Further, the transmitting means 19 describes a sequence number of the media unit 100B$_2$ (for example, '2') in a sequence number field 106$_2$ of the media unit 100B$_2$ and in a sequence number field 302$_2$ of a control signal 300$_2$ corresponding to the media unit 100B$_2$.

Further, the transmitting means 19 describes absolute time indicating the head of the media unit 100B$_2$ (i.e., absolute time indicating the head of MU2 (T_mu2)) in an absolute time field 303$_2$ of the control signal 300$_2$.

Although not illustrated in FIG. 11, the media units 100B$_1$ and 100B$_2$ may include an encapsulation determination information field 103 and a size information field 104 (FIG. 2) as in the case of the first embodiment. In this case, the encapsulation means 16B describes in the encapsulation determination information field 103, as encapsulation determination information, a value indicating that size information is included (for example, other than '0'). Further, the encapsulation means 16B describes size information of each access unit 200 in the size information field 104.

<Relationship Between Absolute Time and CTS Relative Value>

Figure 12:
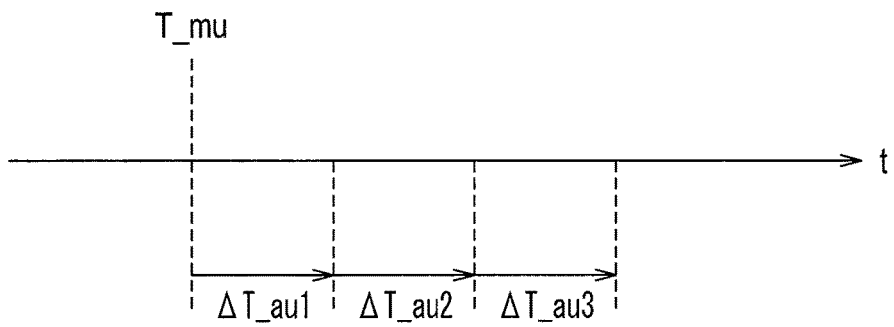
FIG. 12 is an explanatory view illustrating a relationship between absolute time and a CTS relative value in the third embodiment of the present invention.

With reference to FIG. 12, additional explanation on a relationship between the absolute time "T_mu" and the CTS relative value will be given (see FIG. 10 and FIG. 11 as necessary).

The CTS of the head access unit 200$_1$ and the absolute time are the same. In other words, the CTS and the DTS of the head access unit 200$_1$ become identical.

The CTS of the second access unit 200$_2$ is a value obtained by adding ΔT_au1 to the CTS of the head access unit 200$_1$. In other words, ΔT_au1 represents a difference between the CTS of the second access unit 200$_2$ and the CTS of the head access unit 200$_1$. Therefore, this ΔT_au1 is described in the CTS field 102$_1$ as the CTS relative value of the head access unit 200$_1$.

The CTS of the third access unit 200$_3$ is a value obtained by adding ΔT_au2 to the CTS of the second access unit 200$_2$. In other words, ΔT_au2 represents a difference between the CTS of the third access unit 200$_3$ and the CTS of the second access unit 200$_2$. Therefore, this ΔT_au2 is described in the CTS field 102$_2$ as the CTS relative value of the second access unit 200$_2$. Since the fourth access unit 200$_4$ or thereafter are similar to those described above, description will be omitted.

[Configuration of Decoding Device]

Returning to FIG. 10, a configuration of the decoding device 2B will be described. The decoding device 2B extracts one or more access units 200 from the media unit 100B transmitted by the encoding device 1B and decodes the extracted access units 200. Therefore, the decoding device 2B includes a reverse encapsulation means (i.e., a media unit extraction means) 22B, a time stamp reverse calculation means 23B, a decoder 26 and a receiving means 27.

The reception means 27 receives a media unit 100B and a control signal 300 from the encoding device 1 via the network N or the broadcast wave W. Then the reception means 27 sequentially outputs the received media unit 100B and the control signal 300 to the reverse encapsulation means 22B.

The reverse encapsulation means 22B extracts (i.e., reverse encapsulates) one or more access units 200 from the media unit 100B input from the receiving means 27. Here, the reverse encapsulation means 22B specifies, with reference to the size information field 104, a data field of the media unit 100B into which each access unit 200 is encapsulated. Then the reverse encapsulation means 22B outputs the access units 200 to the time stamp reverse calculation means 23B in an order in which the access units 200 have been extracted from the media unit 100B. Further, the reverse encapsulation means 22B outputs the control signal 300 input from the receiving means 27 to the time stamp reverse calculation means 23B.

The time stamp reverse calculation means 23B reversely calculates the DTS and the CTS of the access unit 200 from a time stamp (i.e., the DTS relative value and the CTS relative value) and includes a DTS reverse calculation means 24B and a CTS reverse calculation means 25B.

The DTS reverse calculation means 24B reversely calculates absolute time of the control signal 300 corresponding to the media unit 100B as the DTS of the access unit 200 located at the head. Further, the DTS reverse calculation means 24B reversely calculates, as a DTS of the access unit 200 located at the second place or thereafter, a value obtained by adding the DTS relative value of the access unit 200 and the DTS of another access unit located immediately before the access unit 200.

The CTS reverse calculation means 25B reversely calculates, as a CTS of another access unit located immediately after the access unit 200, a value obtained by adding absolute time of the control signal 300 corresponding to the media unit 100B and a sum of the CTS relative values of from the access unit 200 located at the head to this access unit 200.

<Concrete Example of Reverse Encapsulation>

With reference to FIG. 11, a concrete example of reverse encapsulation by the decoding device 2B will be described (see FIG. 10 as necessary).

The DTS reverse calculation means 24B obtains a correlation between the media unit 100B and the control signal 300 with reference to the ID and the sequence number. In the example of FIG. 11, the DTS reverse calculation means 24B correlates a media unit 100B$_1$ of which ID='1' and sequence number='1' with the control signal 300$_1$. Further, the DTS reverse calculation means 24B correlates a media unit 100B$_2$ of which ID='1' and sequence number='2' with the control signal 300$_2$.

Further, the DTS reverse calculation means 24B reversely calculates, as the DTS of the head access unit 200$_1$, absolute time described in the absolute time field 303$_1$ of the control signal 300$_1$. Further, the DTS reverse calculation means 24B reversely calculates, as a DTS of the second access unit 200$_2$, a value obtained by adding the DTS relative value described in the DTS field 101$_2$ of this access unit 200$_2$ and the already obtained DTS of the head access unit 200$_1$. Further, the DTS reverse calculation means 24B reversely calculates, as a DTS of the third access unit 200$_3$, a value obtained by adding the DTS relative value described in the DTS field $101_3$ of this access unit $200_3$ and the already obtained DTS of the second access unit $200_2$.

Here, the DTS reverse calculation means 24B reversely calculates a DTS between the access units $200_3$ and $200_4$ encapsulated in the different media units $100B_1$ and $100B_2$ if these media units $100B_1$ and $100B_2$ have the same ID. That is, the DTS reverse calculation means 24B reversely calculates, as a DTS of the fourth access unit $200_4$, a value obtained by adding the DTS relative value described in the DTS field $101_4$ of this access unit $200_4$ and the already obtained DTS of the third access unit $200_3$.

Further, the DTS reverse calculation means 24B reversely calculates, as a DTS of the fifth access unit $200_5$, a value obtained by adding the DTS relative value described in the DTS field $101_5$ of this access unit $200_5$ and the already obtained DTS of the fourth access unit $200_4$. Further, the DTS reverse calculation means 24B reversely calculates, as a DTS of the sixth access unit $200_6$, a value obtained by adding the DTS relative value described in the DTS field $101_6$ of this access unit $200_6$ and the already obtained DTS of the fifth access unit $200_5$.

That is, the DTS reverse calculation means 24B reversely calculates the DTS as expressed in the following Expressions (13) to (17).

AU1_DTS=absolute time of the control signal $300_1$

AU2_DTS=AU2_DTS relative value+AU1_DTS   Expression (13)

AU3_DTS=AU3_DTS relative value+AU2_DTS   Expression (14)

AU4_DTS=AU4_DTS relative value+AU3_DTS   Expression (15)

AU5_DTS=AU5_DTS relative value+AU4_DTS   Expression (16)

AU6_DTS=AU6_DTS relative value+AU5_DTS   Expression (17)

The CTS reverse calculation means 25B obtains a correlation between the media unit 100B and the control signal 300 with reference to the ID and the sequence number as in the case of the DTS reverse calculation means 24B. Further, the CTS reverse calculation means 25B reversely calculates, as a CTS of the head access unit $200_1$, absolute time described in the absolute time field $303_1$ of the control signal $300_1$.

Further, the CTS reverse calculation means 25B reversely calculates, as a CTS of the second access unit $200_2$, a value obtained by adding absolute time of the control signal $300_1$ and the CTS relative value of the head access unit $200_1$. Further, the CTS reverse calculation means 25B calculates a sum of the CTS relative values of the access units $200_1$ and $200_2$. Then the CTS reverse calculation means 25B reversely calculates a value obtained by adding absolute time to this sum as a CTS of the third access unit $200_3$.

Here, the CTS reverse calculation means 25B reversely calculates a CTS between the access units $200_3$ and $200_4$ encapsulated in the different media units $100B_1$ and $100B_2$ if these media units $100B_1$ and $100B_2$ have the same ID. That is, the CTS reverse calculation means 25B calculates a sum of the CTS relative values of the access units $200_1$ to $200_3$. Then the CTS reverse calculation means 25B reversely calculates a value obtained by adding absolute time to this sum as a CTS of the fourth access unit $200_4$.

Further, the CTS reverse calculation means 25B calculates a sum of the CTS relative values of the access units $200_1$ to $200_4$. Then the CTS reverse calculation means 25B reversely calculates a value obtained by adding absolute time to this sum as a CTS of the fifth access unit $200_5$.

Further, the CTS reverse calculation means 25B calculates a sum of the CTS relative values of the access units $200_1$ to $200_5$. Then the CTS reverse calculation means 25B reversely calculates a value obtained by adding absolute time to this sum as a CTS of the sixth access unit $200_6$.

Here, additional explanation on the absolute time "T_mu2" of the control signal $300_2$ will be given. In a case in which a broadcast wave W is used, decoding devices 2B which begin receiving at various timings exist in the content providing system 1000B. Here, a case in which a certain decoding device 2B has not been able to receive a control signal $300_1$ will be considered. In this case, the decoding device 2B receives a subsequent control signal $300_2$ and reversely calculates, using absolute time "T_mu2" of this control signal $300_2$, the DTS and the CTS of the access units $200_4$ to $200_6$ encapsulated into the media unit $100B_2$. In this manner, the decoding device 2B begins reproduction of content starting at the media unit $100B_2$ corresponding to the control signal $300_2$ which the decoding device 2B has been able to receive. That is, in the content providing system 1000B, in order that the decoding device 2B may begin receiving at arbitrary timing, it is desirable to periodically transmit, to the decoding device 2B, the control signal 300 to which absolute time is added.

Further, in a case in which the decoding device 2B receives the media units 100B continuously, absolute time of the control signal $300_2$ is not necessary if the fourth access unit $200_4$ is promptly displayed after the third access unit $200_3$. However, in the content providing system 1000B, a clock frequency of the encoding device 1B and a clock frequency of the decoding device 2B do not necessarily coincide precisely. Therefore, in the content providing system 1000B, there is a possibility that an error (i.e., a clock drift) occurs in absolute time if the CTS relative value of each access unit 200 is accumulated. Therefore, in the content providing system 1000B, mapping to absolute time is performed at relatively short intervals to prevent serious errors from occurring. That is, in the content providing system 1000B, in order to reduce errors in the CTS in the access unit 200, it is desirable to periodically transmit, to the decoding device 2B, the control signal 300 to which absolute time is added.

Then the time stamp reverse calculation means 23B sequentially outputs, to the decoder 26, the access units 200 for which the DTS and the CTS have been reversely calculated.

Returning to FIG. 10, description about the configuration of the decoding device 2B will be continued. The decoder 26 decodes the access unit 200 input from the time stamp reverse calculation means 23B according to an image decoding scheme corresponding to the encoder 11. Since both the CTS and the DTS are correlated with the access unit 200, this access unit 200 can be decoded according to the image decoding scheme described above.

[Operation of Encoding Device]

Figure 13:
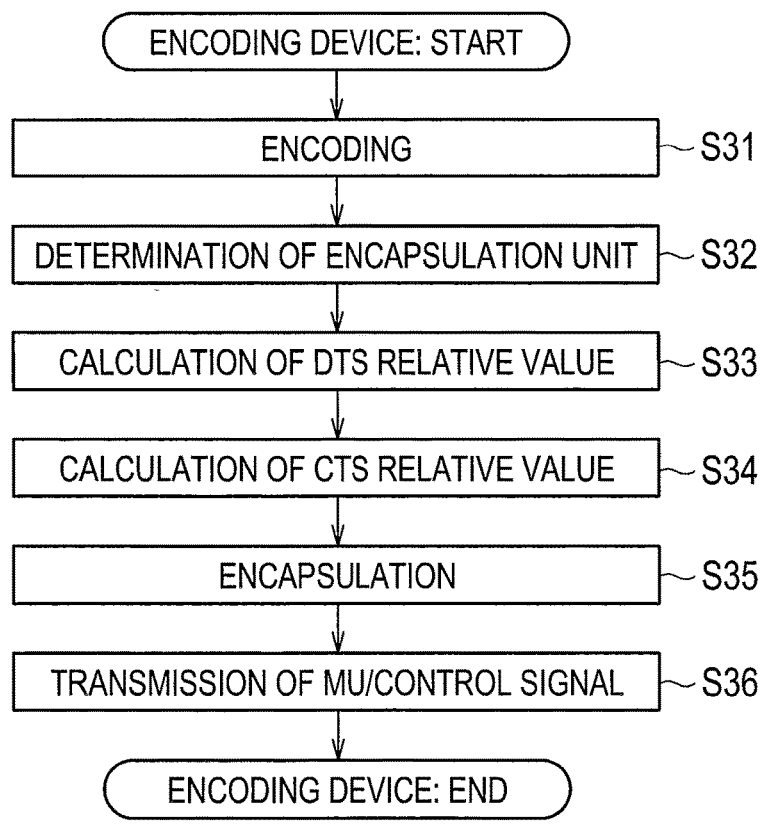
FIG. 13 is a flowchart illustrating an operation of the encoding device of FIG. 10.

An operation of the encoding device 1B will be described with reference to FIG. 13 (see FIG. 10 to FIG. 12 as necessary).

The encoding device 1B encodes, by the encoder 11, an image signal input from outside to generate an access unit 200 correlated with a CTS and a DTS (step S31). The encoding device 1B determines, by the encapsulation determination means 15B, one or more access units as an encapsulation unit on a predetermined encapsulation condition (step S32).

The encoding device 1B calculates the DTS relative value by the DTS relative value calculation means 17 (step S33).

The encoding device 1B calculates the CTS relative value by the CTS relative value calculation means 18 (step S34).

The encoding device 1B encapsulates, by the encapsulation means 16B, the access units 200 into the media unit 100B and adds the DTS relative value and the CTS relative value to each access unit 200 (step S35). The encoding device 1B transmits, by the transmitting means 19, the encapsulated media unit 100B and the control signal 300 corresponding to this media unit 100B to the decoding device 2B via the network N (step S36).

[Operation of Decoding Device]

Figure 14:
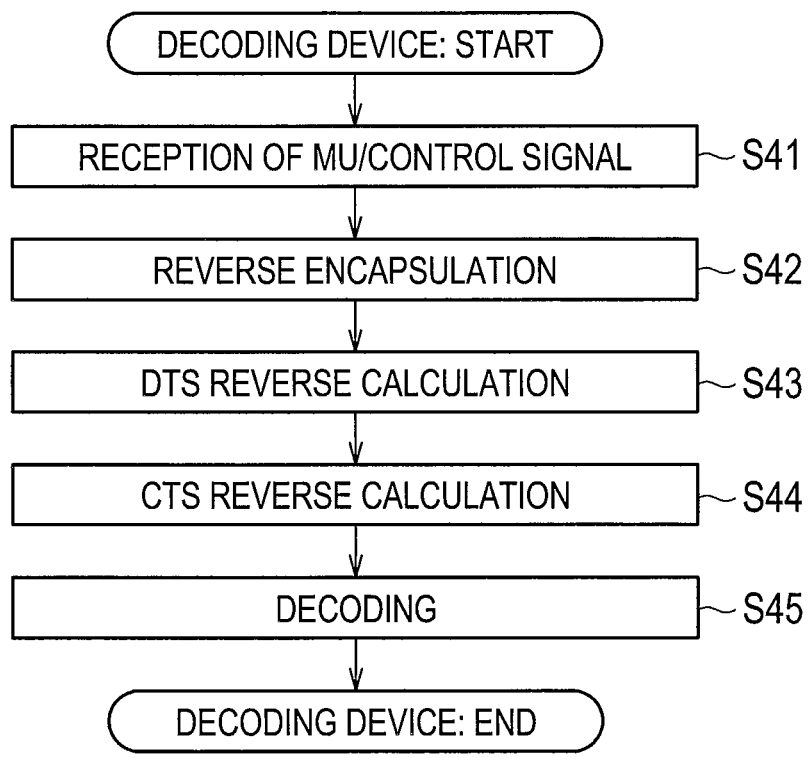
FIG. 14 is a flowchart illustrating an operation of the decoding device of FIG. 10.

An operation of the decoding device 2B will be described with reference to FIG. 14 (see FIG. 10 to FIG. 12 as necessary).

The decoding device 2B receives, by the receiving means 27, the media unit 100B and the control signal 300 from the encoding device 1B via the network N or the broadcast wave W (step S41). The decoding device 2B extracts, by the reverse encapsulation means 22B, one or more access units 200 from the media unit 100B (step S42).

The decoding device 2B reversely calculates the DTS by the DTS reverse calculation means 24B (step S43). The decoding device 2B reversely calculates the CTS by the CTS reverse calculation means 25B (step S44). The decoding device 2B decodes, by the decoder 26, the access units 200 of which the DTS and the CTS are reversely calculated (step S45).

As described above, in the encoding device 1B and the decoding device 2B according to the third embodiment of the present invention, a format in which the base absolute time of the DTS and the CTS are added to a control signal 300 and in which the DTS relative value and the CTS relative value are added to the access unit 200 is adopted. Therefore, the encoding device 1B and the decoding device 2B can easily change the time when the access unit 200 is decoded and the time when the access unit 200 is presented or reproduced only by rewriting the absolute time of the control signal 300. Further, the encoding device 1B and the decoding device 2B can easily implement commonization of the media unit 100B and switching of the transmission paths.

Fourth Embodiment

With reference to FIG. 15 to FIG. 18, a content providing system 1000C according to a fourth embodiment of the present invention will be described with respect to a difference from the third embodiment. The content providing system 1000C provides content (i.e., audio) and includes an encoding device 1C and a decoding device 2C.

[Configuration and Operation of Encoding Device]

Figure 15:
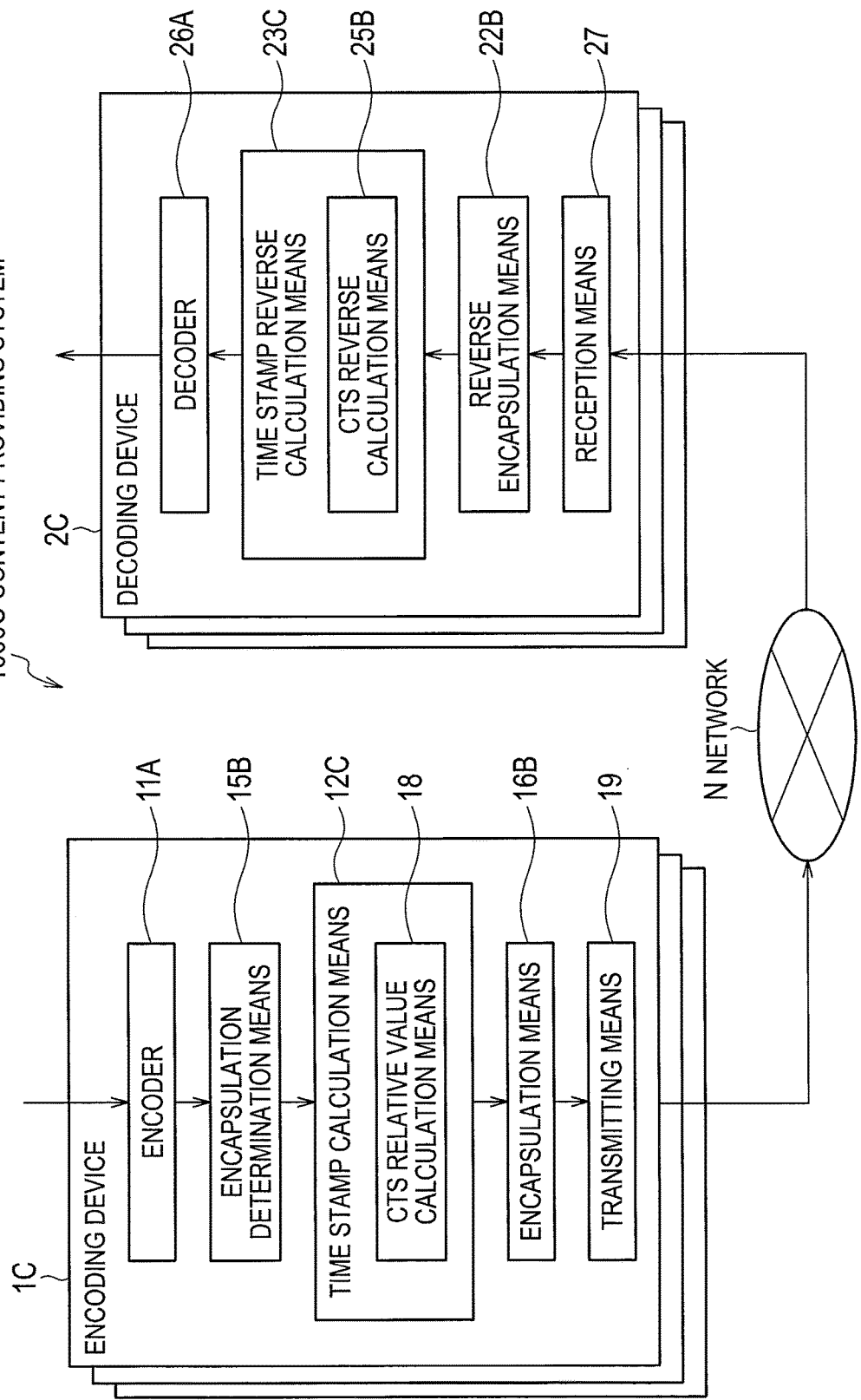
FIG. 15 is a block diagram illustrating configurations of an encoding device and a decoding device according to a fourth embodiment of the present invention.
Figure 16:
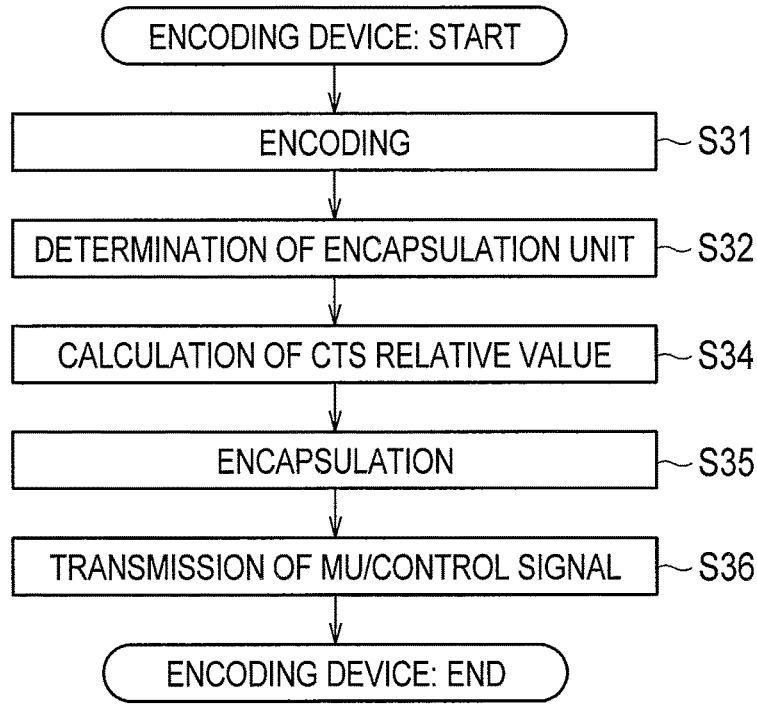
FIG. 16 is a flowchart illustrating an operation of the encoding device of FIG. 15.

The encoding device 1C encodes an audio signal as an input signal and provides the encoded audio signal to the decoding device 2C. As illustrated in FIG. 15, since a configuration of the encoding device 1C is similar to that of the encoding device 1B of FIG. 10 except that an encoder 11A is provided instead of the encoder 11 and that the DTS relative value calculation means 17 is excluded, detailed description of the configuration of the encoding device 1C will be omitted. Further, as illustrated in FIG. 16, since an operation of the encoding device 1C is similar to that illustrated in FIG. 13 except that step S33 is not performed, detailed description of the operation of the encoding device 1C will be omitted.

[Configuration and Operation of Decoding Device]

Figure 17:
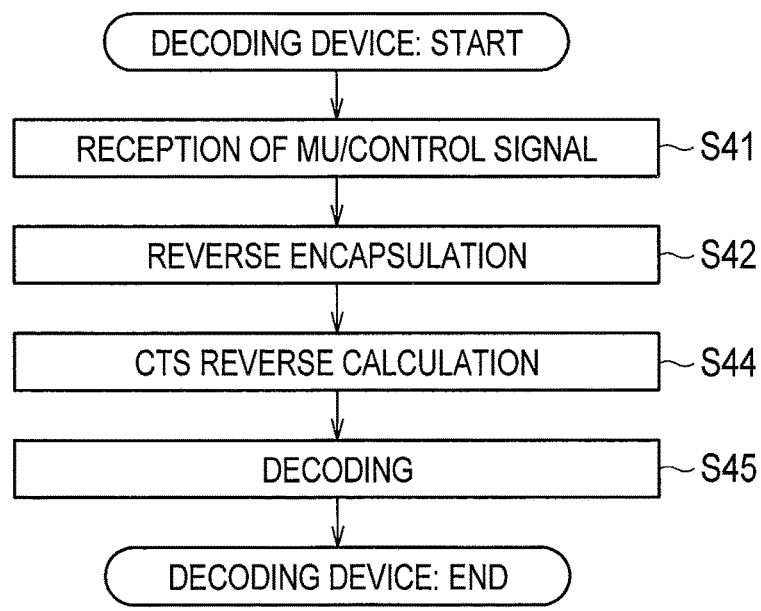
FIG. 17 is a flowchart illustrating an operation of the decoding device of FIG. 15.

The decoding device 2C extracts an access unit 200 from a media unit 100C transmitted by the encoding device 1C and decodes the extracted access unit 200. As illustrated in FIG. 15, since a configuration of the decoding device 2C is similar to that of the decoding device 2B of FIG. 10 except that a decoder 26A is provided instead of the decoder 26 and that the DTS reverse calculation means 24B is excluded, detailed description of the configuration of the decoding device 2C will be omitted. Further, as illustrated in FIG. 17, since an operation of the decoding device 2C is similar to that illustrated in FIG. 14 except that step S43 is not performed, detailed description of the operation of the decoding device 2C will be omitted.

[Format of Media Unit and Control Signal]

Figure 18:
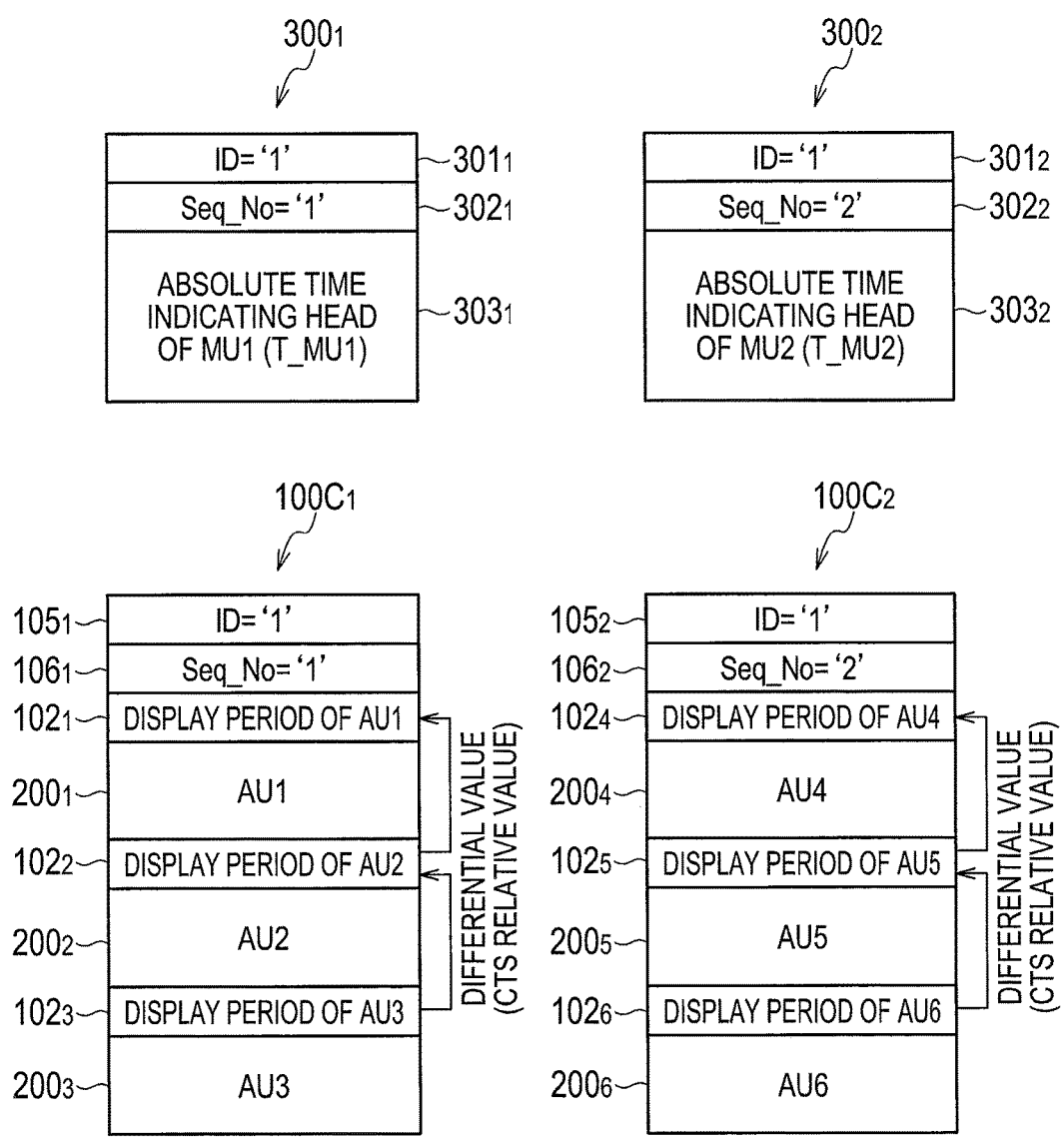
FIG. 18 is a diagram illustrating a format of a media unit in which a plurality of access units are encapsulated and a control signal in the fourth embodiment of the present invention.
Figure 19A:
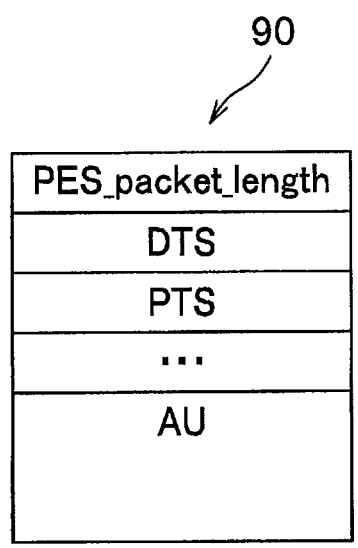
FIG. 19(a) is a diagram illustrating a related art PES and FIG. 19(b) is a diagram illustrating a related art RTP payload.
Figure 19B:
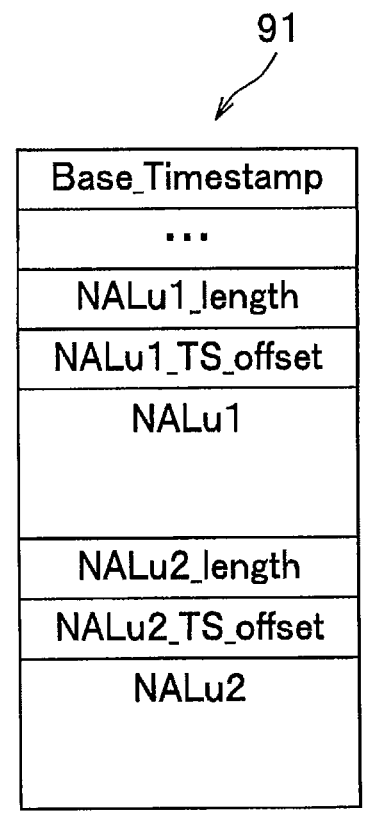

As illustrated in FIG. 18, since the media unit 100C and the control signal 300 are similar to those illustrated in FIG. 11 except that the DTS field 101 is not included in the media unit 100C, detailed description of the media unit 100C and the control signal 300 will be omitted.

As described above, in the encoding device 1C and the decoding device 2C according to the fourth embodiment of the present invention, the same effect as that of the third embodiment can be obtained for the audio content.

Functions of the encoding device and the decoding device according to each embodiment may be implemented by a computer. In that case, the present invention may implement the functions by recording a program for implementing these functions on a computer-readable recording medium, and causing a computer system to read and execute the program recorded on the recording medium.

The "computer system" here should include an OS and hardware, such as peripheral equipment. Further, the "computer-readable recording medium" should include a portable medium, such as a flexible disk, a magnetic-optical disk, a ROM and a CD-ROM, and a storage device, such as a hard disk incorporated in a computer system. Further, the "computer-readable recording medium" may include a medium which dynamically retains a program for a short time, such as a communication line on which the program is transmitted like a network, such as the Internet, and a communication line, such as a telephone line, and a medium which retains a program for a certain period of time, like a volatile memory incorporated in a computer system used as a server or a client in the case described above.

Further, the program described above may be for implementing a part of the function described above and, moreover, may implement the function described above in combination with a program already recorded on a computer system.

(Modification)

Although each embodiment of the present invention has been described, the present invention is not limited to the same and can be implemented in a range without changing the purport thereof. Modification of the embodiments will be described below.

Although the image is handled by the content providing system 1000 and the audio is handled by the content providing system 1000A in the foregoing description, the present invention may also handle both the image and the audio. In this case, in the content providing side, the encoding device 1 of FIG. 1 generates a media unit of the image and the encoding device 1A of FIG. 6 generates a media unit of the audio. Then, in the content providing side, the media unit of the image and the media unit of the audio are multiplexed and transmitted to the content receiving side. Further, in the content receiving side, the multiplexed media unit is divided into the media unit of the image and the media unit of the audio. Then, in the content receiving side, the media unit of the image is decoded by the decoding device 2 of FIG. 1 and the media unit of the audio is decoded by the decoding device 2A of FIG. 6.

Further, the content providing systems 1000 and 100A may include two or more encoding devices 1 and 1A and two or more decoding devices 2 and 2A. Further, in the content providing systems 1000 and 100A, the media unit generated by the encoding devices 1 and 1A may be recorded on a magneto-optical recording medium and may be provided to the decoding devices 2 and 2A in an offline manner, such as mailing. Further, in the content providing systems 1000 and 100A, the encoding devices 1 and 1A and the decoding devices 2 and 2A may be provided in the same device, the media units generated by the encoding devices 1 and 1A may be accumulated, and the accumulated media units may be provided to the decoding devices 2 and 2A.

What is claimed is:

1. An encoding device performing an encoding process according to an encoding scheme using a Composition Time Stamp (CTS) indicative of a time at which presentation or reproduction is performed, comprising:
   an encapsulation circuit configured to generate a media unit in which one or more access units encoded by the encoding scheme are capsulated, and
   a transmitter configured to transmit the media unit and a set of information along with the media unit, the set of information being indicative of an absolute time of one of the one or more access units encapsulated at a top portion of the media unit, transmitter being configured to transmit the set of information as a signal separate from the media unit, wherein
   the encapsulation circuit is configured to add a CTS relative value to a first access unit encapsulated in the media unit, the CTS relative value being a difference between a CTS assigned to the first access unit and a CTS assigned to a second access unit immediately succeeding the first access unit in presentation in order for a decoder to decode the one or more access units using the absolute time and the CTS relative value to perform presentation or reproduction at the CTS.

2. The encoding device according to claim 1, wherein the encoding scheme is a scheme using a Decoding Time Stamp (DTS) indicative of a time at which decoding is performed, and
   the encapsulation circuit is configured to adds a DTS relative value to the first access unit in addition to the CTS relative value, the DTS relative value being a difference between a DTS assigned to the first access unit and a DTS assigned to a third access unit immediately preceding the first access unit in encoding.

3. The encoding device according to claim 1, wherein the transmitter is configured to transmit, in addition to the media unit and the set of information, (i) an identifier assigned to a respective media unit, a common identifier being assigned to identify multiple media units to be transmitted via a common transmission path and (ii) a sequence number unique to a respective media unit.

4. A decoding device performing a decoding process according to a decoding scheme using a Composition Time Stamp (CTS) indicative of a time at which presentation or reproduction is performed, comprising:
   a receiver configured to receive (i) a media unit in which one or more access units are capsulated, and (ii) a set of information being indicative of an absolute time of one of the one or more access units encapsulated at a top portion of the media unit, the receiver being configured to receive the set of information as a signal separate from the media unit, and
   a decoder configured to decode the one or more access units according to the decoding scheme, wherein
   in the media unit, a CTS relative value is added to a first access unit encapsulated in the media unit, the CTS relative value being a difference between a CTS assigned to the first access unit and a DTS assigned to a second access unit immediately succeeding the first access unit in presentation, and
   the decoder is configured to decode the one or more access units using the absolute time and the CTS relative value to perform presentation or reproduction at the CTS.

5. The decoding device according to claim 4, wherein the decoding scheme is a scheme using a Decoding Time Stamp (DTS) indicative of a time at which decoding is performed,
   in the media unit, a DTS relative value is added to the first access unit in addition to the CTS relative value, the DTS relative value being a difference between a DTS assigned to the first access unit and a DTS assigned to a third access unit immediately preceding the first access unit in decoding, and
   the decoder is configured to decode the one or more access units using the DTS relative value in addition to the absolute time and the CTS relative value.

6. The decoding device according to claim 4, wherein, the receiver is configured to receive, in addition to the media unit and the set of information, (i) an identifier assigned to a respective media unit, a common identifier is assigned to identify multiple media units to be received via a common transmission path and (ii) a sequence number unique to a respective media unit.

7. An encoding method performing an encoding process according to an encoding scheme using a Composition Time Stamp (CTS) indicative of a time at which presentation or reproduction is performed, comprising the steps of:
   generating a media unit in which one or more access units encoded by the encoding scheme are encapsulated, and
   transmitting the media unit and a set of information being indicative of an absolute time of one of the one or more access units encapsulated at a top portion of the media unit the transmitting step comprising transmitting the set of information as a signal separate from the media unit, wherein
   the generating step comprises adding a CTS relative value to a first access unit encapsulated in the media unit, the CTS relative value being a difference between a CTS assigned to the first access unit and a CTS a second access unit immediately succeeding the first access unit in presentation in order for a decoder to decode the one or more access units using the absolute time and the CTS relative value to perform presentation or reproduction at the CTS.

8. A decoding method performing a decoding process according to a decoding scheme using a Composition Time Stamp (CTS) indicative of a time at which presentation or reproduction is performed, comprising the steps of:
   receiving a media unit in which one or more access units are encapsulated, and a set of information being indicative of an absolute time of one of the one or more access units encapsulated at a top portion of the media unit, the receiving step comprising receiving the set of information as a signal separate from the media unit, and
   decoding the one or more access units according to the decoding scheme, wherein
   in the media unit, a CTS relative value is added to a first access unit encapsulated in the media unit, the CTS relative value being a difference between a CTS assigned to a first access unit and a CTS assigned to a second access unit immediately succeeding the first access unit in presentation, and the decoding step comprises decoding the one or more access units using the absolute time and the CTS relative value to perform presentation or reproduction at the CTS.

9. A non-transitory computer readable recording medium storing a program for performing an encoding process according to an encoding scheme using a Composition Time Stamp (CTS) indicative of a time at which presentation or reproduction is performed, the program being executable by a computer to:

generate a media unit in which one or more access units encoded by the encoding scheme are encapsulated, and transmit the media unit and a set of information being indicative of an absolute time of one of the one or more access units encapsulated at a top portion of the media unit, transmitting the media unit and a set of information comprising transmitting the set of information as a signal separate from the media unit, wherein generating step comprises adding a CTS relative value to a first access unit encapsulated in the media unit, the CTS relative value being a difference between a CTS assigned to the first access unit and a CTS assigned to a second access unit immediately succeeding the first access unit in presentation in order for a decoder to decode the one or more access units using the absolute time and the CTS relative value to perform presentation or reproduction at the CTS.

10. A non-transitory computer readable recording medium storing a program for performing a decoding process according to a decoding scheme using a Composition Time Stamp (CTS) indicative of a time at which presentation or reproduction is performed, the program being executable by a computer to:

receive a media unit in which one or more access units are capsulated, and a set of information being indicative of an absolute time of one of the one or more access units encapsulated at a top portion of the media unit, receiving the media unit and the set of information comprising receiving the set of information as a signal separate from the media unit, and decoding the one or more access units according to the decoding scheme, wherein in the media unit, a CTS relative value is added to a first access unit encapsulated in the media unit, the CTS relative value being a difference between a CTS assigned to the first access unit and a CTS assigned to a second access unit immediately succeeding the first access unit in presentation, and the decoding step comprises decoding the one or more access units using the absolute time and the CTS relative value to perform presentation or reproduction at the CTS.

* * * * *